(12) United States Patent
Xie et al.

(10) Patent No.: US 12,113,882 B2
(45) Date of Patent: Oct. 8, 2024

(54) IPv6 PACKET PROCESSING METHOD AND APPARATUS

(71) Applicant: Huawei Technologies Co., Ltd., Shenzhen (CN)

(72) Inventors: Jingrong Xie, Beijing (CN); Yang Xia, Beijing (CN); Gang Yan, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 17/689,284

(22) Filed: Mar. 8, 2022

(65) Prior Publication Data
US 2022/0191310 A1    Jun. 16, 2022

Related U.S. Application Data

(63) Continuation of application No. PCT/CN2020/104878, filed on Jul. 27, 2020.

(30) Foreign Application Priority Data

Sep. 9, 2019  (CN) .......................... 201910848563.9
Oct. 31, 2019 (CN) .......................... 201911074212.3

(51) Int. Cl.
*H04L 69/22*  (2022.01)
*H04L 45/74*  (2022.01)

(52) U.S. Cl.
CPC ............. *H04L 69/22* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 11,012,353 B2* | 5/2021 | Bhandari | H04L 9/0861 |
| 2005/0157723 A1* | 7/2005 | Kim | H04L 47/10 |
| | | | 370/395.21 |
| 2006/0168267 A1* | 7/2006 | Fernandes | H04L 69/167 |
| | | | 709/230 |

(Continued)

FOREIGN PATENT DOCUMENTS

| | | |
|---|---|---|
| CN | 101645849 A | 2/2010 |
| CN | 108781171 A | 11/2018 |

(Continued)

OTHER PUBLICATIONS

C. Filsfils et al, "SRv6 Network Programming, draft-filsfils-spring-srv6-network-programming-01," Jun. 28, 2017, 48 pages.

(Continued)

*Primary Examiner* — Duc T Duong
(74) *Attorney, Agent, or Firm* — Conely Rose, P.C.

(57) ABSTRACT

An IPv6 packet processing method and apparatus where a first routing device obtains an IPv6 packet, and sends the IPv6 packet to a next-hop routing device. The IPv6 packet includes an IPv6 extension header that includes preceding general indication information, where the preceding general indication information includes first information, and where the first information is used to indicate to process the IPv6 packet only on a data plane of a routing device and not to send the IPv6 packet to a CPU.

20 Claims, 16 Drawing Sheets

| Next Header | Hdr Ext Len | Opt Type = X | Opt Length = 6 |
|---|---|---|---|
| Flags | TLV Number | \multicolumn{2}{c|}{Function} |
| \multicolumn{2}{c|}{Parameter} | Opt Type | Opt Length |
| \multicolumn{4}{c|}{BIER header} |

(56) References Cited

U.S. PATENT DOCUMENTS

| | | | | |
|---|---|---|---|---|
| 2010/0063988 | A1* | 3/2010 | Khalid | H04L 45/38 709/202 |
| 2013/0044679 | A1 | 2/2013 | Rathonyi et al. | |
| 2014/0314102 | A1* | 10/2014 | Hur | H04L 69/18 370/465 |
| 2015/0256456 | A1* | 9/2015 | Previdi | H04L 45/745 370/392 |
| 2017/0244631 | A1* | 8/2017 | Guichard | H04L 45/306 |
| 2017/0250907 | A1 | 8/2017 | Pignataro et al. | |
| 2021/0099382 | A1* | 4/2021 | Liu | H04L 45/741 |
| 2022/0159545 | A1* | 5/2022 | Lee | H04W 28/0205 |

FOREIGN PATENT DOCUMENTS

| | | |
|---|---|---|
| CN | 109067652 A | 12/2018 |
| WO | 2016000659 A1 | 1/2016 |

OTHER PUBLICATIONS

L. Geng et al, "Inter-Domain Multicast Deployment using BIERv6," draft-geng-bier-ipv6-inter-domain-00, Jul. 4, 2019, 12 pages.

F. Baker et al, "IPv6 Hop-by-Hop Options Extension Header," draft-ietf-6man-hbh-header-handling-02, Mar. 8, 2016, 10 pages.

R. Hinden et al, "IPv6 Minimum Path MTU Hop-by-Hop Option," draft-ietf-6man-mtu-option-00, Aug. 9, 2019, 16 pages.

C. Filsfils, Ed. et al, "IPv6 Segment Routing Header (SRH)," draft-ietf-6man-segment-routing-header-14, Jun. 28, 2018, 33 pages.

C. Filsfils, Ed. et al, "IPv6 Segment Routing Header (SRH)," draft-ietf-6man-segment-routing-header-22, Aug. 6, 2019, 37 pages.

M. McBride et al, "BIER IPv6 Requirements," draft-ietf-bier-ipv6-requirements-01, Jul. 1, 2019, 15 pages.

P. Psenak, Ed. et al, "IS-IS Extension to Support Segment Routing over IPv6 Dataplane," draft-ietf-lsr-isis-srv6-extensions-02.txt, Jul. 4, 2019, 27 pages.

C. Filsfils et al, "SRv6 Network Programming," draft-ietf-spring-srv6-network-programming-01, Jul. 3, 2019, 47 pages.

S. Bhandari et al, "In-situ OAM IPv6 Options," draft-ioametal-ippm-6man-ioam-ipv6-options-02, Mar. 28, 2019, 11 pages.

Z. Li et al, "Enhancement of IPv6 Extension Header," draft-li-6man-enhanced-extension-header-00, Jul. 8, 2019, 15 pages.

Z. Li et al, "IPv6 Encapsulation for SFC and IFIT," draft-li-6man-ipv6-sfc-ifit-01, Jul. 8, 2019, 13 pages.

Eric C Rosen, "Re: [Bier] New Version Notification for draft-pfister-bier-over-ipv6-00.txt," Sep. 12, 2016, UTCShow header, 3 pages.

Eric C Rosen, "Re: [Bier] New Version Notification for draft-pfister-bier-over-ipv6-00.txt," Sep. 15, 2016, UTCShow header, 3 pages.

P. Pfister et al, "An IPv6 based BIER Encapsulation and Encoding," draft-pfister-bier-over-ipv6-01, Oct. 31, 2016, 7 pages.

J. Xie et al, "Encapsulation for BIER in Non-MPLS IPv6 Networks," draft-xie-bier-6man-encapsulation-02, Sep. 1, 2018, 13 pages.

J. Xie et al, "Encapsulation for BIER in Non-MPLS IPv6 Networks," draft-xie-bier-ipv6-encapsulation-02, Jul. 1, 2019, 16 pages.

J. Xie et al, "Encapsulation for BIER in Non-MPLS IPv6 Networks," draft-xie-bier-ipv6-encapsulation-03, Jul. 20, 2019, 15 pages.

J. Xie et al, "BIER IPv6 Encapsulation (BIERv6) Support via IS-IS," draft-xie-bier-ipv6-isis-extension-00, Jul. 1, 2019, 8 pages.

J. Xie et al, "Use of BIER IPv6 Encapsulation (BIERv6) for Multicast VPN in IPv6 networks," draft-xie-bier-ipv6-mvpn-01, Jul. 1, 2019, 14 pages.

X. Xu Ed. et al, "A Transport-Independent Bit Index Explicit Replication (BIER) Encapsulation Header," draft-xu-bier-encapsulation-06, Sep. 23, 2016, 8 pages.

Z. Zhang et al, "BIER in IPv6 (BIERin6)," draft-zhang-bier-bierin6-03, Jul. 8, 2019, 9 pages.

C. Filsfils et al, "Segment Routing Part I," Jan. 2017, English Abstract, 2 pages.

R. Perlman, "Interconnections: Bridges, Routers, Switches and Internetworking Protocols, Second Edition," Released Sep. 1999, English Abstract, 2 pages.

D. Comer, et al, "Network Systems Design Using Network Processors," 2005, English Abstract, 1 pages.

RFC 2460, S. Deering et al "Internet Protocol, Version 6 (IPv6) Specification," Dec. 1998, 39 pages.

RFC 2710, S. Deering et al, "Multicast Listener Discovery (MLD) for IPv6," Oct. 1999, 22 pages.

RFC 2711, C. Partridge et al, "IPv6 Router Alert Option," Oct. 1999, 6 pages.

RFC 2780, S. Bradner et al, "IANA Allocation Guidelines for Values in the Internet Protocol and Related Headers," Mar. 2000, 10 pages.

RFC 3692, T. Narten et al, "Assigning Experimental and Testing Numbers Considered Useful," Jan. 2004, 7 pages.

RFC 4302, S. Kent, "IP Authentication Header," Dec. 2005, 34 pages.

RFC 4303, S. Kent et al, "IP Encapsulating Security Payload (ESP)," Dec. 2005, 44 pages.

RFC 4727, B. Fenner, "Experimental Values in IPv4, IPv6, ICMPv4, ICMPv6, UDP, and TCP Headers," Nov. 2006, 11 pages.

RFC 5095, J. Abley et al, "Deprecation of Type 0 Routing Headers in IPv6," Dec. 2007, 7 pages.

RFC 5237, J. Arkko et al, "IANA Allocation Guidelines for the Protocol Field," Feb. 2008, 5 pages.

RFC 5533, E. Nordmark et al, "Shim6: Level 3 Multihoming Shim Protocol for IPv6," Jun. 2009, 124 pages.

RFC 5871, J. Arkko et al, "IANA Allocation Guidelines for the IPv6 Routing Header," May 2010, 3 pages.

RFC 6275, C. Perkins, Ed. et al, "Mobility Support in IPv6," Jul. 2011, 169 pages.

RFC 6553, J. Hui et al, "The Routing Protocol for Low-Power and Lossy Networks (RPL) Option for Carrying RPL Information in Data-Plane Datagrams," Mar. 2012, 9 pages.

RFC 6564, S. Krishnan et al, "A Uniform Format for IPv6 Extension Headers," Apr. 2012, 6 pages.

RFC 6621, J. Macker, Ed. et al, "Simplified Multicast Forwarding," May 2012, 55 pages.

RFC 7045, B. Carpenter et al, "Transmission and Processing of IPv6 Extension Headers," Dec. 2013, 10 pages.

RFC 7401, R. Moskowitz, Ed. et al, "Host Identity Protocol Version 2 (HIPv2)," Apr. 2015, 128 pages.

RFC 7837, S. Krishnan et al, "IPv6 Destination Option for Congestion Exposure (ConEx)," May 2016, 13 pages.

RFC 8200, S. Deering et al, "Internet Protocol, Version 6 (IPv6) Specification," Jul. 2017, 42 pages.

* cited by examiner

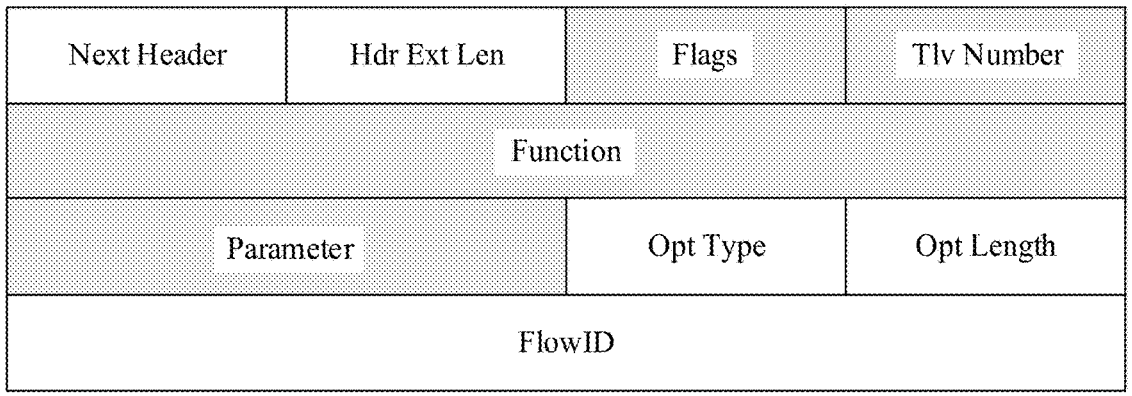

FIG. 13

```
IF (Flags includes indication information "require data plane processing")
    IF (Function, Tlv Number) is Data-Plane-Capable
        Execute (Function, Tlv Number) in Data-Plane
    ELSE
        IF (Flags includes indication information "ignore the HBH and forward the packet")
            Ignore the whole DOH and forwarding the packet
        IF (Flags includes indication information "drop the packet")
            Drop the packet in Data-plane, optionally send ICMP message
ELSE
    Executing Other procedures in order as RFC8200
```

FIG. 14

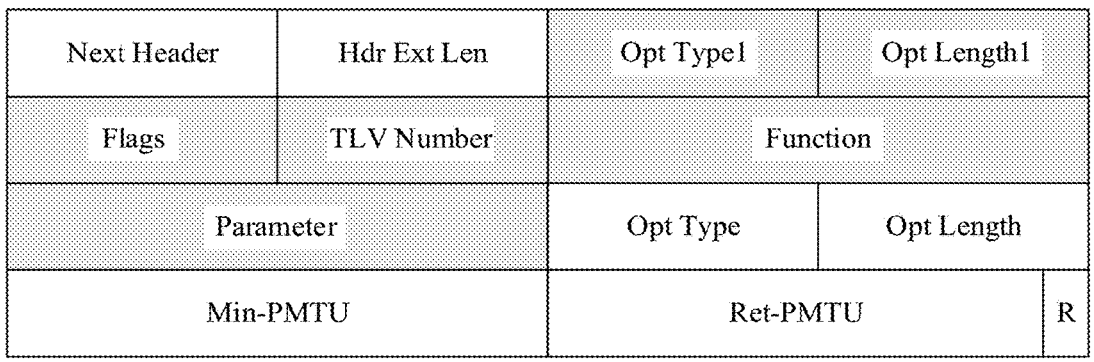

FIG. 15A

| Next Header | Hdr Ext Len | Opt Type = 5 | Opt Length = 6 |
|---|---|---|---|
| Value | | Parameter | |
| Flags | TLV Number | Opt Type | Opt Length |
| Min-PMTU | | Rtn-PMTU | R |

FIG. 15B

| Next Header | Hdr Ext Len | Flags | Tlv Number |
|---|---|---|---|
| Function | | | |
| Parameter | | Opt Type | Opt Length |
| Min-PMTU | | Ret-PMTU | R |

FIG. 15C

```
Switch OptType1:
  Case Preceding-General-TLV
  IF (Flags includes indication information "require data plane processing")
    IF (Function, Tlv Number) is Data-Plane-Capable
      Execute (Function, Tlv Number) in Data-Plane
    ELSE
      IF (Flags includes indication information "ignore the HBH and forward the packet")
        Ignore the whole DOH and forwarding the packet
      ELSE
        Drop the packet in Data-plane, optionally send ICMP message
  ELSE
    Executing Other procedures in order as RFC8200
  Case TLV-1:
    Executing old procedure to TLV-1
  Case TLV-2:
    Executing old procedure to TLV-2
```

FIG. 16

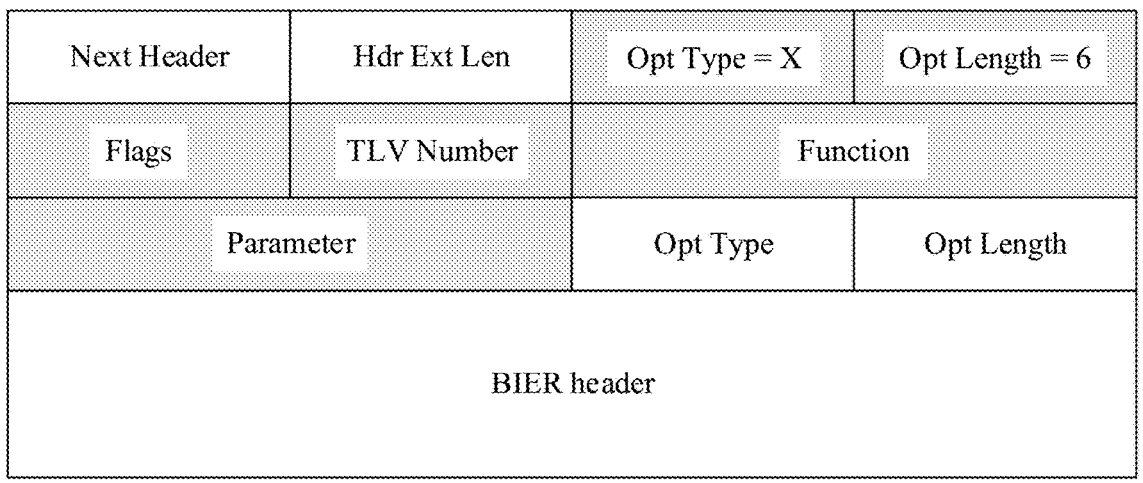

FIG. 17A

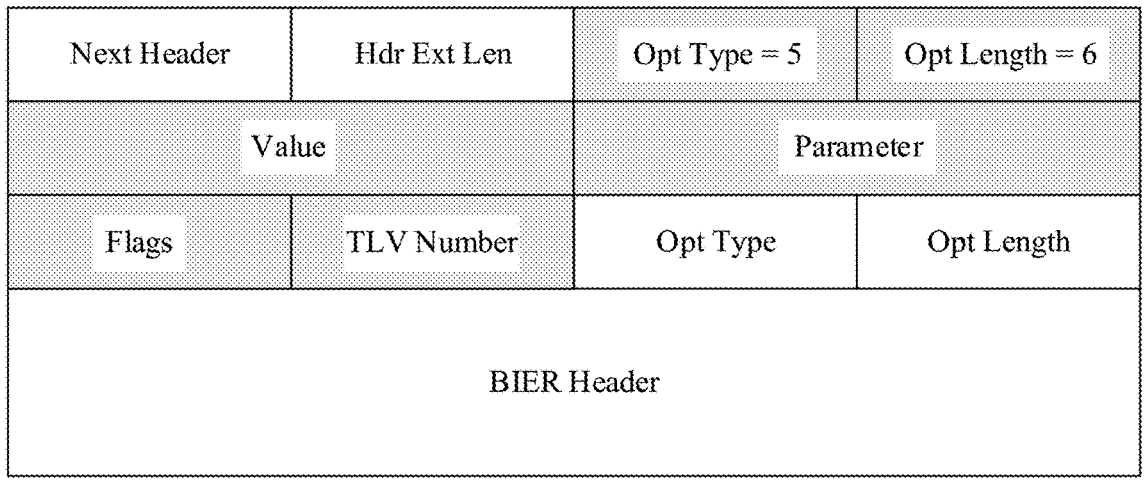

FIG. 17B

```
Switch OptType1:
   Case Preceding-General-TLV
IF (Flags includes indication information "require data plane processing")
   IF (Function, Tlv Number) is Data-Plane-Capable
      Execute (Function, Tlv Number) in Data-Plane
   ELSE
      Drop the packet in Data-plane, optionally send ICMP message
ELSE
   Executing Other procedures in order as RFC8200
   Case TLV-1:
      Executing old procedure to TLV-1
   Case TLV-2:
      Executing old procedure to TLV-2
```

FIG. 18

IPv6 PACKET PROCESSING METHOD AND APPARATUS

CROSS-REFERENCE TO RELATED APPLICATIONS

This is a continuation of International Application No. PCT/CN2020/104878, filed on Jul. 27, 2020, which claims priority to Chinese Patent Application No. 201910848563.9, filed on Sep. 9, 2019, and claims priority to Chinese Patent Application No. 201911074212.3, filed on Oct. 31, 2019. All of the aforementioned patent applications are hereby incorporated by reference in their entireties.

TECHNICAL FIELD

This application relates to the field of communications technologies, and in particular, to an Internet Protocol (IP) version 6 (IPv6) packet processing method and apparatus.

BACKGROUND

In a current related technology, a routing device may process an IPv6 packet on a data plane. "Data plane processing" is a fast-path (fast-path) processing manner, and generally may be implemented by hardware such as a dedicated routing chip or a switching chip in the routing device. In the current related technology, an IPv6 extension header is processed as follows. For example, Internet Engineering Task Force (IETF) Request for Comments (RFC) 8200 defines header formats of a hop-by-hop options header (HBH) and a destination options header (DOH). The first two bytes are followed by options. These options include several type-length-value (TLV) options. RFC also specifies that, when the HBH or the DOH is processed, the TLV options need to be processed in sequence.

Correspondingly, after a packet is sent to a central processing unit (CPU), the packet is processed by the CPU. This is also referred to as "slow-path processing". In a modern router or switch, a CPU for "slow-path processing" is generally a general-purpose CPU, for example, a CPU for processing a network protocol packet. A packet sent to the CPU and processed by the CPU can also be sent to a data plane for forwarding. However, packet processing performance is greatly reduced. Generally, a rate of sending a packet is limited before the packet is sent to the CPU, and a packet that exceeds the rate is discarded.

In a scenario in which a routing device processes an IPv6 extension header on the data plane, the data plane may support processing of some TLV options but does not support processing of some other TLV options based on a processing capability of the data plane. When a TLV option that cannot be processed exists in an existing processing procedure, the data plane may send a packet to the CPU for processing. As described above, packet processing is further delayed when the packet is sent to the CPU for processing, resulting in low packet processing efficiency. In addition, if the CPU cannot process the packet, the packet is discarded. Consequently, an invalid processing procedure is generated.

SUMMARY

Embodiments of this application provide an IPv6 packet processing method and apparatus, to improve IPv6 packet processing efficiency.

According to a first aspect, an embodiment of this application provides an IPv6 packet processing method. The method is applied to a communications network, and the communications network includes a first routing device and at least one second routing device. The method is performed by the first routing device. In the method, the first routing device obtains an IPv6 packet, where the IPv6 packet includes an IPv6 extension header, the IPv6 extension header includes preceding general indication information, and the preceding general indication information includes first information used to indicate to process the IPv6 packet only on a data plane of a routing device and not to send the IPv6 packet to a CPU. The preceding general indication information may be added by the first routing device. Then, the first routing device sends the IPv6 packet including the preceding general indication information to a next-hop routing device, where the next-hop routing device is the second routing device.

In some embodiments of this application, the IPv6 packet sent by the first routing device to the second routing device may include the first information used to indicate to process the packet only on the data plane and not send the packet to the CPU. Therefore, after receiving the IPv6 packet, the next-hop routing device processes the IPv6 packet on the data plane, thereby effectively improving processing efficiency of the IPv6 packet.

With reference to the first aspect, in a possible design of the first aspect, the IPv6 extension header may include at least one TLV option, and the preceding general indication information may further include one or more of second information, third information, and fourth information. The second information is used to indicate a function or a type of the at least one TLV option in the IPv6 extension header, or a function or a type of a primary TLV option in the at least one TLV option in the IPv6 extension header. The third information is used to indicate a function or a type of a secondary TLV option in the at least one TLV option in the IPv6 extension header. The fourth information is used to indicate a quantity of the at least one TLV option in the IPv6 extension header.

In some embodiments of this application, the one or more of the second information, the third information, and the fourth information are carried in the preceding general indication information, so that the next-hop routing device can determine, based on the preceding general indication information, whether to support processing of the at least one TLV option in the IPv6 packet, to correspondingly process the IPv6 packet. In this case, the next-hop routing device does not traverse one or more TLV options blindly, and discards the packet when there is a TLV option that cannot be processed. This causes invalid processing and resource waste. For example, the extension header includes three TLV options, and the data plane supports processing of the first two TLV options and performs corresponding processing. However, the data plane does not support processing of the third TLV option, and therefore the packet is discarded. The previous processing resources are wasted.

With reference to the first aspect, in a possible design of the first aspect, the preceding general indication information may further include fifth information, and the fifth information is used to indicate to ignore the IPv6 extension header and continue to forward the IPv6 packet, or discard the IPv6 packet when a data plane of a routing device does not support processing of the at least one TLV option in the IPv6 extension header. In a specific implementation, that the fifth information indicates to ignore the IPv6 extension header and continue to forward the IPv6 packet, or discard the IPv6 packet may be that, when the preceding general indication information includes the fifth information, the fifth information is used to indicate that the IPv6 extension header may be ignored and forwarding of the IPv6 packet may be continued. When the preceding general indication information does not include the fifth information, the fifth information is used to indicate that the IPv6 packet may be discarded.

In some embodiments of this application, the fifth information is carried in the preceding general indication information, so that when the next-hop routing device does not support processing of the at least one TLV option in the IPv6 extension header, the next-hop routing device may ignore the IPv6 extension header and continue to forward the IPv6 packet, to quickly process the IPv6 packet on the data plane. For example, the extension header includes three TLV options, and the next-hop routing device determines, based on the second information, the third information, and the fourth information in the preceding general indication information, that the data plane does not support processing of the three TLV options. It may mean that some or all of the three TLV options are not supported, or a quantity of TLV options is not supported. For example, the next-hop routing device supports processing of a maximum of only two TLV options. In this case, the next-hop routing device may ignore the IPv6 extension header and continue to forward the packet based on the fifth information, so that the IPv6 packet is quickly processed on the data plane.

With reference to the first aspect, in a possible design of the first aspect, the preceding general indication information may further include sixth information, and the sixth information is used to indicate to send an Internet Control Message Protocol (ICMP) message to a source address of the IPv6 packet when the IPv6 packet is discarded.

In some embodiments of this application, when the next-hop routing device does not support processing of the at least one TLV option in the IPv6 extension header, the next-hop routing device may discard the IPv6 packet on the data plane. Discarding the IPv6 packet on the data plane may also be understood as fast processing of the packet on the data plane. For example, the next-hop routing device may discard the IPv6 packet when the preceding general indication information does not include information used to indicate to ignore the IPv6 extension header. In this way, the sixth information is carried in the preceding general indication information, so that the next-hop routing device may send the ICMP message to the source address of the IPv6 packet, to notify information indicating that the IPv6 packet is discarded. If necessary, the source address of the IPv6 packet may also retransmit the packet subsequently.

With reference to the first aspect, in a possible design of the first aspect, the preceding general indication information is included in a preceding general header in the IPv6 extension header, and the preceding general header is located before the at least one TLV option.

In some embodiments of this application, because the preceding general header is located before the at least one TLV option in the IPv6 extension header, the next-hop routing device may first read the preceding indication information in the preceding general header before traversing the at least one TLV option. Therefore, the IPv6 packet is quickly processed on the data plane according to the indication of the preceding general indication information.

With reference to the first aspect, in a possible design of the first aspect, the preceding general header may be a fixed header of the IPv6 extension header; or the preceding general header may be one piece of preceding general TLV in the IPv6 extension header; or the preceding general header and the at least one TLV option may be included in one piece of preceding general TLV in the IPv6 extension header.

With reference to the first aspect, in a possible design of the first aspect, the preceding general header may include a Flags field, a Function field, a parameter field, and a TLV Number field. The Flags field includes one or more of the first information, the fifth information, and the sixth information. The Function field includes the second information. The parameter field includes the third information. The TLV Number field includes the fourth information.

With reference to the first aspect, in a possible design of the first aspect, the IPv6 extension header may be a HBH or a DOH.

With reference to the first aspect, in a possible design of the first aspect, the IPv6 extension header is the hop-by-hop options header HBH, and the IPv6 packet is an IPv6 packet used for a flow classified function or a path maximum transport unit (PMTU) function; or the IPv6 extension header is the DOH, and the IPv6 packet is an IPv6 packet that supports a bit index explicit replication IPv6 encapsulation (BIERv6) function.

According to a second aspect, an embodiment of this application provides an IPv6 packet processing method. The method is applied to a communications network, and the communications network includes a first routing device and at least one second routing device. The method may be performed by the second routing device. In the method, the second routing device receives an IPv6 packet from a previous-hop routing device, where the IPv6 packet includes an IPv6 extension header, the IPv6 extension header includes preceding general indication information, the preceding general indication information includes first information, and the first information is used to indicate to process the IPv6 packet only on a data plane of a routing device and not to send the IPv6 packet to a CPU. The second routing device processes the IPv6 packet on the data plane based on the first information. The previous-hop routing device is a previous-hop routing device of a second routing device on a forwarding path from a source address of the IPv6 packet to a destination address of the IPv6 packet in the communications network. The previous-hop routing device may be the first routing device or another second routing device in the at least one second routing device.

In some embodiments of this application, because the IPv6 packet received by the second routing device from the first routing device may include the first information used to indicate to process the packet only on the data plane and not to send the packet to the CPU, the second routing device can process the IPv6 packet on the data plane, and does not send the IPv6 packet to the CPU for processing, thereby improving processing efficiency of the IPv6 packet.

With reference to the second aspect, in a possible design of the second aspect, the IPv6 extension header may include at least one TLV option, and the preceding general indication information may further include one or more of second information, third information, and fourth information. The second information is used to indicate a function or a type of the at least one TLV option in the IPv6 extension header, or a function or a type of a primary TLV option in the at least one TLV option in the IPv6 extension header. The third information is used to indicate a function or a type of a secondary TLV option in the at least one TLV option in the IPv6 extension header. The fourth information is used to indicate a quantity of the at least one TLV option in the IPv6 extension header. In this case, the second routing device may determine, based on the one or more of the second information, the third information, and the fourth information, whether a data plane of the second routing device supports processing of the at least one TLV option in the IPv6 extension header.

In some embodiments of this application, the one or more of the second information, the third information, and the fourth information are carried in the preceding general indication information, so that the second routing device can determine, based on the preceding general indication information, whether to support processing of the at least one TLV option in the IPv6 packet, to correspondingly process the IPv6 packet. In this case, the second routing device does not traverse one or more TLV options blindly, and discards the packet when there is a TLV option that cannot be processed. This causes invalid processing and resource waste.

With reference to the second aspect, in a possible design of the second aspect, if the second routing device determines, based on the one or more of the second information, the third information, and the fourth information, that the data plane does not support processing of the at least one TLV option in the IPv6 extension header, the second routing device may further determine whether the preceding general indication information includes fifth information. If the preceding general indication information includes the fifth information, the second routing device may ignore the IPv6 extension header and continue to forward the IPv6 packet, or discard the IPv6 packet based on the fifth information. In an implementation, when the preceding general indication information includes the fifth information, the second routing device may ignore the IPv6 extension header and continue to forward the IPv6 packet, or discard the IPv6 packet on the data plane when the preceding general indication information does not include the fifth information.

With reference to the second aspect, in a possible design of the second aspect, if the second routing device determines, based on the one or more of the second information, the third information, and the fourth information, that the data plane supports processing of the at least one TLV option in the IPv6 extension header, the second routing device may traverse the at least one TLV option on the data plane, and continue to forward the IPv6 packet after the traversal is completed, so that the IPv6 packet is processed on the data plane.

Further, if the second routing device determines, in a process of traversing the at least one TLV option, that processing of any TLV option in the at least one TLV option is not supported, the second routing device may determine whether the preceding general indication information includes fifth information. If the preceding general indication information includes the fifth information, the second routing device may ignore the IPv6 extension header and continue to forward the IPv6 packet, or discard the IPv6 packet on the data plane based on the fifth information. In an implementation, when the preceding general indication information includes the fifth information, the second routing device may ignore the IPv6 extension header and continue to forward the IPv6 packet, or discard the IPv6 packet on the data plane when the preceding general indication information does not include the fifth information.

In some embodiments of this application, the fifth information is carried in the preceding general indication information, so that even if the second routing device determines that the at least one TLV option in the IPv6 extension header is not supported, or the second routing device determines, in a process of traversing the IPv6 extension header, that any TLV option in the IPv6 extension header is not supported, the IPv6 packet can be quickly processed on the data plane. In this case, processing the IPv6 packet on the data plane may be ignoring the IPv6 extension header and continuing to forward the IPv6 packet, or directly discarding the IPv6 packet.

With reference to the second aspect, in a possible design of the second aspect, if the second routing device needs to discard the IPv6 packet, the second routing device may determine whether the preceding general indication information includes sixth information. If the preceding general indication information includes the sixth information, when discarding the IPv6 packet, the second routing device may send an internet control message protocol ICMP message to a source address of the IPv6 packet, to notify information indicating that the IPv6 packet is discarded. If necessary, the source address of the IPv6 packet may also retransmit the packet subsequently.

With reference to the second aspect, in a possible design of the second aspect, the preceding general indication information is included in a preceding general header in the IPv6 extension header, and the preceding general header is located before the at least one TLV option. In this way, the second routing device may first read the preceding indication information in the preceding general header before traversing the at least one TLV option, to ensure that the IPv6 packet is processed on the data plane.

With reference to the second aspect, in a possible design of the second aspect, the preceding general header may be a fixed header of the IPv6 extension header; or the preceding general header may be one piece of preceding general TLV in the IPv6 extension header; or the preceding general header and the at least one TLV option may be included in one piece of preceding general TLV in the IPv6 extension header.

With reference to the second aspect, in a possible design of the second aspect, the preceding general header may include a Flags field, a Function field, a Parameter field, and a TLV Number field. The Flags field includes one or more of the first information, the fifth information, and the sixth information. The Function field includes the second information. The Parameter field includes the third information. The TLV Number field includes the fourth information.

With reference to the second aspect, in a possible design of the second aspect, the IPv6 extension header is a HBH or a DOH.

With reference to the second aspect, in a possible design of the second aspect, the IPv6 extension header is the HBH, and the IPv6 packet is an IPv6 packet used for a flow classified function or a PMTU function; or the IPv6 extension header is the DOH, and the IPv6 packet is an IPv6 packet that supports a BIERv6 function.

According to a third aspect, an embodiment of this application provides a packet processing apparatus. The apparatus has a function of implementing the first routing device in any one of the first aspect or the possible designs of the first aspect, or has a function of implementing the second routing device in any one of the second aspect or the possible designs of the second aspect. The apparatus may be a routing device, for example, a router or a switch, or may be an apparatus included in the routing device, for example, a chip. The function of the apparatus may be implemented by hardware, or may be implemented by hardware by executing corresponding software. The hardware or the software includes one or more modules corresponding to the function.

In a possible design, a structure of the apparatus includes a processing module and a transceiver module. The processing module is configured to support the apparatus in performing a corresponding function of the first routing device in any one of the first aspect or the designs of the first aspect. The transceiver module is configured to support communication between the apparatus and another routing device. For example, when the communications apparatus is a first routing device, the communications apparatus may send an IPv6 packet to a second routing device. The apparatus may further include a storage module. The storage module is coupled to the processing module, and stores program instructions and data that are necessary for the apparatus. In an example, the processing module may be a processor, a communications module may be a transceiver, and the storage module may be a memory. The memory may be integrated with the processor, or may be disposed separately from the processor. This is not limited in this application.

In another possible design, a structure of the apparatus includes a processor, and may further include a memory. The processor is coupled to the memory, and may be configured to execute computer program instructions stored in the memory, so that the apparatus performs the method in any one of the first aspect or the possible designs of the first aspect or the method in any one of the second aspect or the possible designs of the second aspect. Optionally, the apparatus further includes a communications interface, and the processor is coupled to the communications interface. The communications interface may be a transceiver or an input/output interface. When the apparatus is a chip included in the routing device, the communications interface may be an input/output interface of the chip. Optionally, the transceiver may be a transceiver circuit, and the input/output interface may be an input/output circuit.

According to a fourth aspect, an embodiment of this application provides a chip system, including a processor. The processor is coupled to a memory, and the memory is configured to store a program or instructions. The chip system may further include an interface circuit, and the interface circuit is configured to receive code instructions and transmit the code instructions to the processor. When the program or the instructions are executed by the processor, the chip system is enabled to implement the method in any one of the first aspect or the possible designs of the first aspect or the method in any one of the second aspect or the possible designs of the second aspect.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory (ROM). The memory and the processor may be integrated into a same chip, or may be disposed on different chips. A type of the memory and a manner of disposing the memory and the processor are not limited in this application.

According to a fifth aspect, an embodiment of this application provides a computer-readable storage medium. The computer storage medium stores computer-readable instructions. When a computer reads and executes the computer-readable instructions, the computer is enabled to perform the method in any one of the first aspect or the possible designs of the first aspect or the method in any one of the second aspect or the possible designs of the second aspect.

According to a sixth aspect, an embodiment of this application provides a computer program product. When a computer reads and executes the computer program product, the computer is enabled to perform the method in any one of the first aspect or the possible designs of the first aspect or the method in any one of the second aspect or the possible designs of the second aspect.

According to a seventh aspect, an embodiment of this application provides a network system. The network system includes the foregoing first routing device and the foregoing at least one second routing device. Optionally, the network system may further include a third routing device.

BRIEF DESCRIPTION OF DRAWINGS

FIG. 13 is a schematic diagram of a structure of an HBH in a flow classified service scenario according to an embodiment of this application;

FIG. 14 is a schematic logical diagram of processing an IPv6 packet by a second routing device in a flow classified service scenario according to an embodiment of this application;

FIG. 15A to FIG. 15C are schematic diagrams of a structure of an HBH in a PMTU service scenario according to an embodiment of this application;

FIG. 16 is a schematic logical diagram of processing an IPv6 packet by a second routing device in a PMTU service scenario according to an embodiment of this application;

FIG. 17A and FIG. 17B are schematic diagrams of a structure of a DOH in a BIERv6 service scenario according to an embodiment of this application;

FIG. 18 is a schematic logical diagram of processing an IPv6 packet by a second routing device in a BIERv6 service scenario according to an embodiment of this application;

DESCRIPTION OF EMBODIMENTS

To make objectives, technical solutions, and advantages of embodiments of this application clearer, the following further describes the embodiments of this application with reference to accompanying drawings.

IPv6 is a next-generation internet protocol developed after Internet Protocol version 4 (IPv4). Compared with IPv4, IPv6 uses a 128-bit IPv6 address. This can effectively increase addressing space.

An IPv6 packet includes an IPv6 basic header and an IPv6 extension header, and the IPv6 basic header and the IPv6 extension header may be concatenated by using a Next Header field, to form an IPv6 header chain. The IPv6 basic header may also be referred to as an IPv6 basic header or an IPv6 header, and the IPv6 extension header may also be referred to as an IPv6 extension header. This is not limited in this application.

Figure 1:
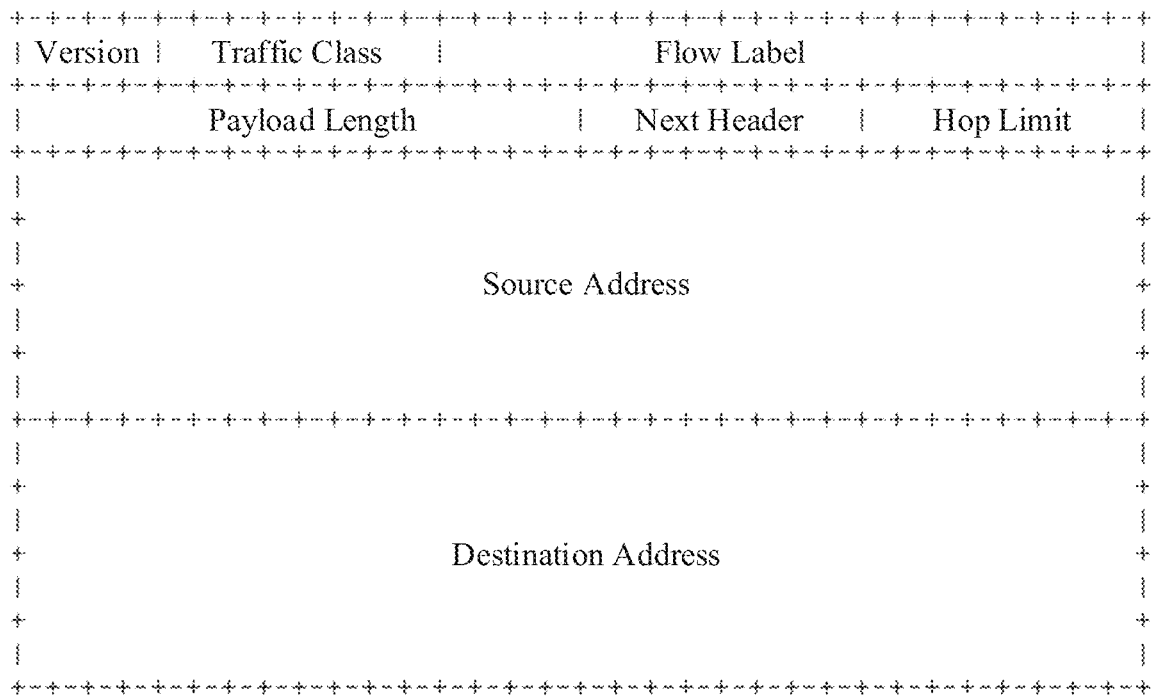
FIG. 1 is a schematic diagram of a structure of an IPv6 basic header according to an embodiment of this application.

FIG. 1 is a schematic diagram of a structure of an IPv6 basic header according to an embodiment of this application. The IPv6 basic header includes a version field, a traffic class field, a flow label field, a payload length field, a Next Header field, a hop limit field, a source address field, and a destination address field. The Next Header field in the IPv6 basic header may indicate an IPv6 extension header, or may indicate an upper layer upper layer header. When the upper layer header is indicated, a value of the Next Header field may be the same as a value of a protocol field in an IPv4 packet, and is defined in "assigned Internet protocol numbers" of the Internet Assigned Numbers Authority (IANA). If the IPv6 extension header is indicated, a value of the Next Header field is defined in "IPv6 Extension Header Types" of the IANA. For example, the value 0 of the Next Header field is used to indicate an IPv6 HBH. For another example, the value 60 of the Next Header field is used to indicate an IPv6 DOH.

Figure 2A:
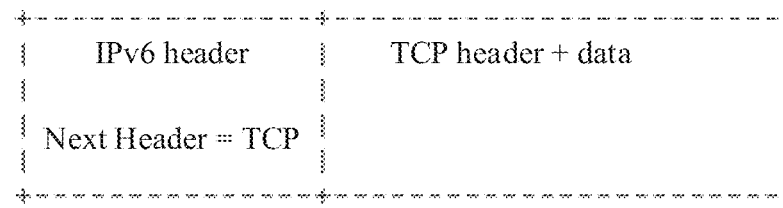
FIG. 2A to FIG. 2C are schematic diagrams of extending an IPv6 basic header by using a Next Header field according to an embodiment of this application.
Figure 2B:
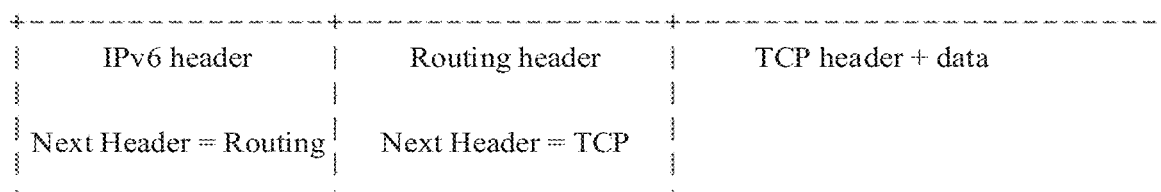
Figure 2C:
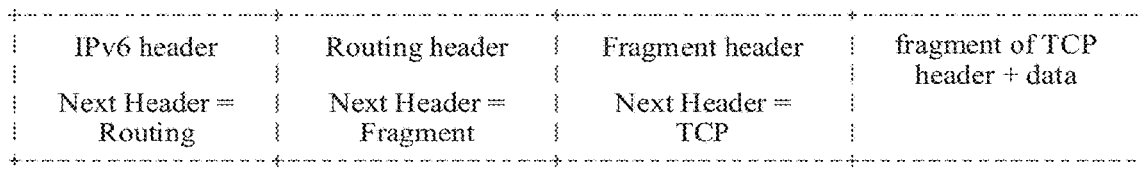

FIG. 2A to FIG. 2C show examples of extending an IPv6 basic header by using a Next Header field according to an embodiment of this application. In FIG. 2A, the Next Header field in the IPv6 basic header indicates an upper layer header, and the upper layer header is a Transmission Control Protocol (TCP) header. In FIG. 2B, the Next Header field in the IPv6 basic header is used to indicate a routing header, a Next Header field in the routing header is used to indicate an upper layer header, and the upper layer header is a TCP header. In FIG. 2C, the Next Header field in the IPv6 basic header is used to indicate a routing header, a Next Header field in the routing header is used to indicate a fragment header, a Next Header field in the fragment header is used to indicate an upper layer header, and the upper layer header is a TCP header. It may be understood that the IPv6 basic header and the IPv6 extension header each may include a Next Header field used to indicate a type of a next extension header. In addition to the examples in FIG. 2A to FIG. 2C, many other IPv6 extension headers may be obtained through extension by using the Next Header field.

In some embodiments of this application, the IPv6 extension header may be an HBH for IPv6, a routing header for IPv6, a fragment header for IPv6, an encapsulating security payload header, an authentication header, a DOH for IPv6, a mobility extension header, or the like. No enumeration is provided in this application.

Figure 3:
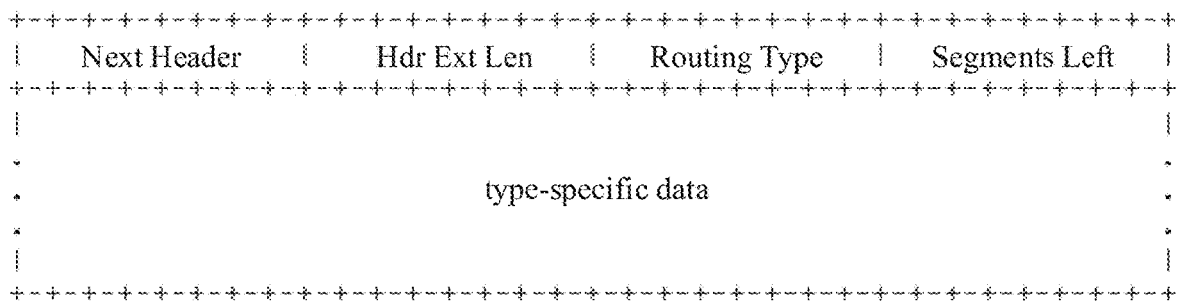
FIG. 3 is a schematic diagram of a structure of a routing header according to an embodiment of this application.

FIG. 3 is a schematic diagram of a structure of a routing header according to an embodiment of this application. The routing header may be referred to as an RH for short. As shown in FIG. 3, the RH includes a Next Header field, a Hdr Ext Len field, a routing type field, a segments left field, and a type-specific data field.

Figure 4:
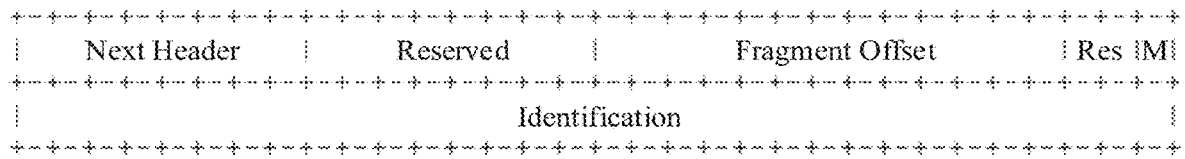
FIG. 4 is a schematic diagram of a structure of a fragment header according to an embodiment of this application.

FIG. 4 is a schematic diagram of a structure of a fragment header according to an embodiment of this application. The fragment header may be referred to as an FH for short. As shown in FIG. 4, the FH includes a Next Header field, a reserved field, a fragment offset field, a res field, an M field, and an identification field.

Figure 5:
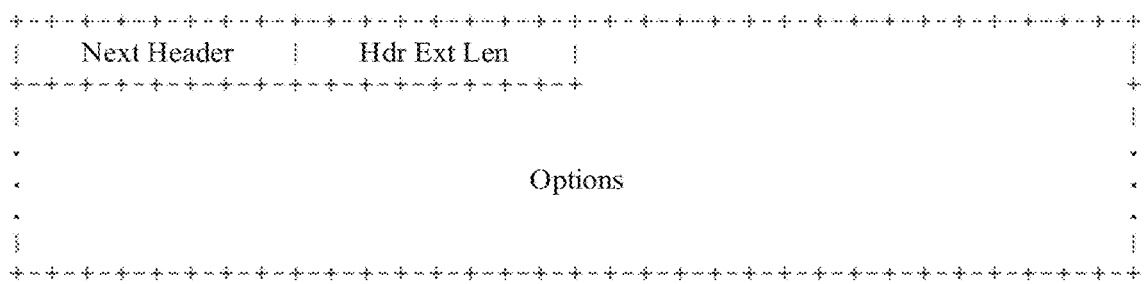
FIG. 5 is a schematic diagram of a structure of a HBH according to an embodiment of this application.
Figure 6:
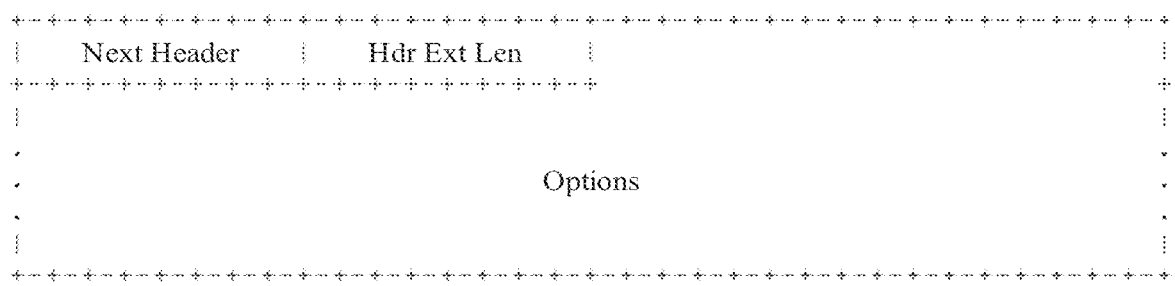
FIG. 6 is a schematic diagram of a structure of a destination option header according to an embodiment of this application.

FIG. 5 and FIG. 6 are schematic diagrams of structures of a hop-by-hop option header and a destination options header according to an embodiment of this application. The hop-by-hop option header may be referred to as an HBH for short. The destination options header may be referred to as a DOH for short. In addition, fields included in the HBH and the DOH may be the same, and each may include a Next Header field, a Hdr Ext Len field, and an options field. It can be learned from FIG. 5 and FIG. 6 that, in designs of the HBH and the DOH, there may be no fixed header, and the options field of each of the HBH and the DOH may be obtained by combining several TLV options. In this way, the HBH and DOH may support any combination of a plurality of pieces of TLV. The TLV defines specific processing behavior.

An IPv6 extension header is designed to improve IPv6 extensibility. However, an existing routing device generally does not process, on a data plane, an IPv6 packet that carries an IPv6 extension header, but sends, to a CPU for processing, the IPv6 packet that carries the IPv6 extension header. Consequently, processing efficiency of the IPv6 packet is relatively low. In some embodiments of this application, "processing a packet on a data plane" is "fast-path processing". Generally, a packet is processed by dedicated hardware or a chip in a routing device, for example, a routing chip or a switching chip. For example, the chip may be an application-specific integrated circuit (ASIC) chip or a network processor chip. Alternatively, "processing a packet on a data plane" may be implemented by software on the data plane. This is not limited in this application. "Sending a packet to a CPU for processing" is "slow path processing". Generally, a packet is processed by a general-purpose CPU in a routing device, for example, a CPU that processes a network protocol packet. If the packet is sent to the CPU, the CPU may discard the packet, or send the packet to the data plane (for example, the ASIC chip in the routing device) again for processing. The CPU may further specify a specific port in the ASIC chip to forward the packet. It can be learned that sending the packet to the CPU for processing further delays packet processing and reduces packet forwarding efficiency.

In addition, based on a processing capability of the data plane, only a TLV option whose type is X can be processed on the data plane, and a TLV option whose type is Y/Z/W cannot be processed on the data plane at a specific stage. In this case, when an IPv6 extension header of an IPv6 packet received by the data plane of the routing device includes a TLV option whose type is Y/Z/W, the routing device may send the IPv6 packet to the CPU for processing. The IPv6 packet may be processed on the data plane of the routing device, or when the data plane of the routing device does not support processing of the TLV option whose type is Y/Z/W, the IPv6 extension header in which the TLV option is located is ignored, and the IPv6 packet continues to be forwarded. After the IPv6 packet is sent to the CPU of the routing device, if the CPU of the routing device cannot process the IPv6 packet, the IPv6 packet is finally discarded. Consequently, an invalid processing procedure is generated, and processing resources are wasted.

In addition, with improvement of chip technologies, the data plane of the routing device may also gradually increase a processing capability of the IPv6 extension header. However, even if the IPv6 extension header of the IPv6 packet is processed on the data plane of the routing device, based on a current specification requirement, when an options field in the IPv6 extension header includes a plurality of TLV options, the TLV options in the IPv6 extension header need to be traversed in sequence. In addition, a type field of each TLV option is used to indicate an action ("act") that can be performed when the data plane of the routing device does not support processing of the TLV option, for example, the TLV option may be ignored and a subsequent TLV option (act=0) may be processed, or a packet (act=1) may be discarded. The first two bits of the type field of each TLV option may be used to indicate an action performed when processing is not supported. The two bits may also be referred to as an act bit or an act value.

Traversing the TLV options in the IPv6 extension header one by one may cause a case in which the data plane of the routing device finally discards the packet after traversing the TLV options at high costs. Consequently, resources are wasted. For example, the IPv6 packet includes an HBH, and an options field of the HBH includes three concatenated TLV options. If the data plane of the routing device needs to process the IPv6 packet, when processing the HBH, the data plane of the routing device needs to traverse the three TLV options one by one, and determine, based on an act bit in each TLV option, how to process the TLV option.

In an example, the first TLV option is a TLV whose act is 0, and the second TLV option is a TLV option whose act is 1. The data plane of the routing device supports processing of the first TLV option. After the processing of the first TLV option is completed, when the data plane of the routing device traverses the second TLV option, if it is found that processing of the second TLV is not supported, the data plane of the routing device discards the IPv6 packet because the act of the second TLV option is 1. In another example, the first TLV option is a TLV whose act is 0, and the second TLV option is a TLV option whose act is 1. The data plane of the routing device does not support processing of the first TLV option. However, because the act of the first TLV option is 0, the first TLV option is ignored for proceeding. When the data plane of the routing device traverses the second TLV option, if it is found that processing of the second TLV option is not supported, the data plane of the routing device discards the IPv6 packet because the act of the second TLV option is 1. In still another example, the first TLV option is a TLV whose act is 1, and the second TLV option is a TLV option whose act is 1. The data plane of the routing device supports processing of the first TLV option. After the processing of the first TLV option is completed, when the data plane of the routing device traverses the second TLV option, if it is found that processing of the second TLV option is not supported, the data plane of the routing device discards the IPv6 packet because the act of the second TLV option is 1. It can be learned that resources are wasted in the foregoing example scenarios. Because the IPv6 packet is finally discarded, resources for processing TLV are wasted.

Figure 7:
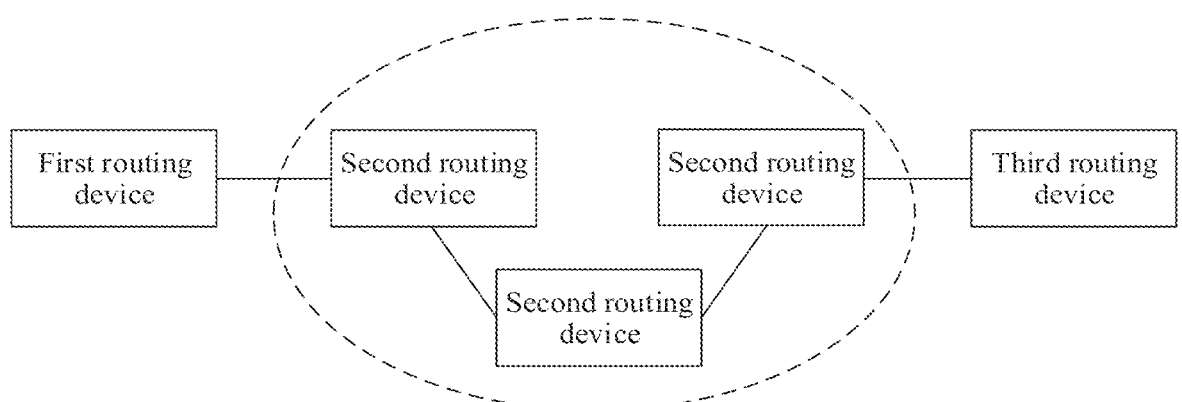
FIG. 7 is a schematic diagram of a network architecture to which a network system is applicable according to an embodiment of this application.

FIG. 7 is a schematic diagram of a structure of a network system to which an embodiment of this application is applicable. The network system includes a first routing device, at least one second routing device, and a third routing device. The first routing device is an ingress node, and is configured to obtain an IPv6 packet, and send the IPv6 packet to a next-hop routing device. The second routing device is an intermediate forwarding node, and is configured to receive an IPv6 packet from a previous-hop routing device, and forward the IPv6 packet to a next-hop routing device. The third routing device is an egress node, and is configured to receive an IPv6 packet from a previous-hop routing device. It may be understood that the first routing device is corresponding to a source address of the IPv6 packet, and the third routing device is corresponding to a destination address of the IPv6 packet.

In some embodiments of this application, the next-hop routing device of the first routing device may be the first second routing device on a forwarding path from the source address of the IPv6 packet to the destination address of the IPv6 packet. The previous-hop routing device of the second routing device may be the first routing device or a previous second routing device on the forwarding path from the source address of the IPv6 packet to the destination address of the IPv6 packet. The next-hop routing device of the second routing device may be a next second routing device or the third routing device on the forwarding path from the source address of the IPv6 packet to the destination address of the IPv6 packet. The previous-hop routing device of the third routing device may be the last second routing device on the forwarding path from the source address of the IPv6 packet to the destination address of the IPv6 packet.

It should be understood that the third routing device in some embodiments of this application is the last routing device on the forwarding path from the source address of the IPv6 packet to the destination address of the IPv6 packet, and the third routing device may also be referred to as the second routing device. A difference between the second routing device and another second routing device lies in that the second routing device does not have a next-hop routing device, and does not continue to forward the IPv6 packet, but still processes the IPv6 packet on a data plane in a same manner as the another second routing device. Therefore, an IPv6 packet processing method described in the following embodiments of this application is also applicable to the third routing device.

It should be further understood that a quantity of second routing devices shown in FIG. 7 is merely an example. Some embodiments of this application set no limitation on a quantity of second routing devices on a path from the first routing device to the third routing device in the network system.

It can be learned that the first routing device expects that each intermediate second routing device can normally process and forward the IPv6 packet instead of discarding the IPv6 packet, so that the IPv6 packet can be successfully forwarded to the third routing device through the at least one second routing device, and is correspondingly processed on the third routing device. As described above, after receiving the IPv6 packet, the third routing device may also process the IPv6 packet according to a processing procedure similar to that of the second routing device, but a difference lies in that the third routing device does not have a next-hop routing device, and therefore does not further forward the IPv6 packet to the next-hop routing device.

It should be noted that the routing device in some embodiments of this application may be a router, a routing node, a forwarding node, a forwarding device, a switch, a switching device, or the like, or may have another name. This is not limited in this application. Unless otherwise stated, ordinal numbers such as "first" and "second" in the embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

Figure 8:
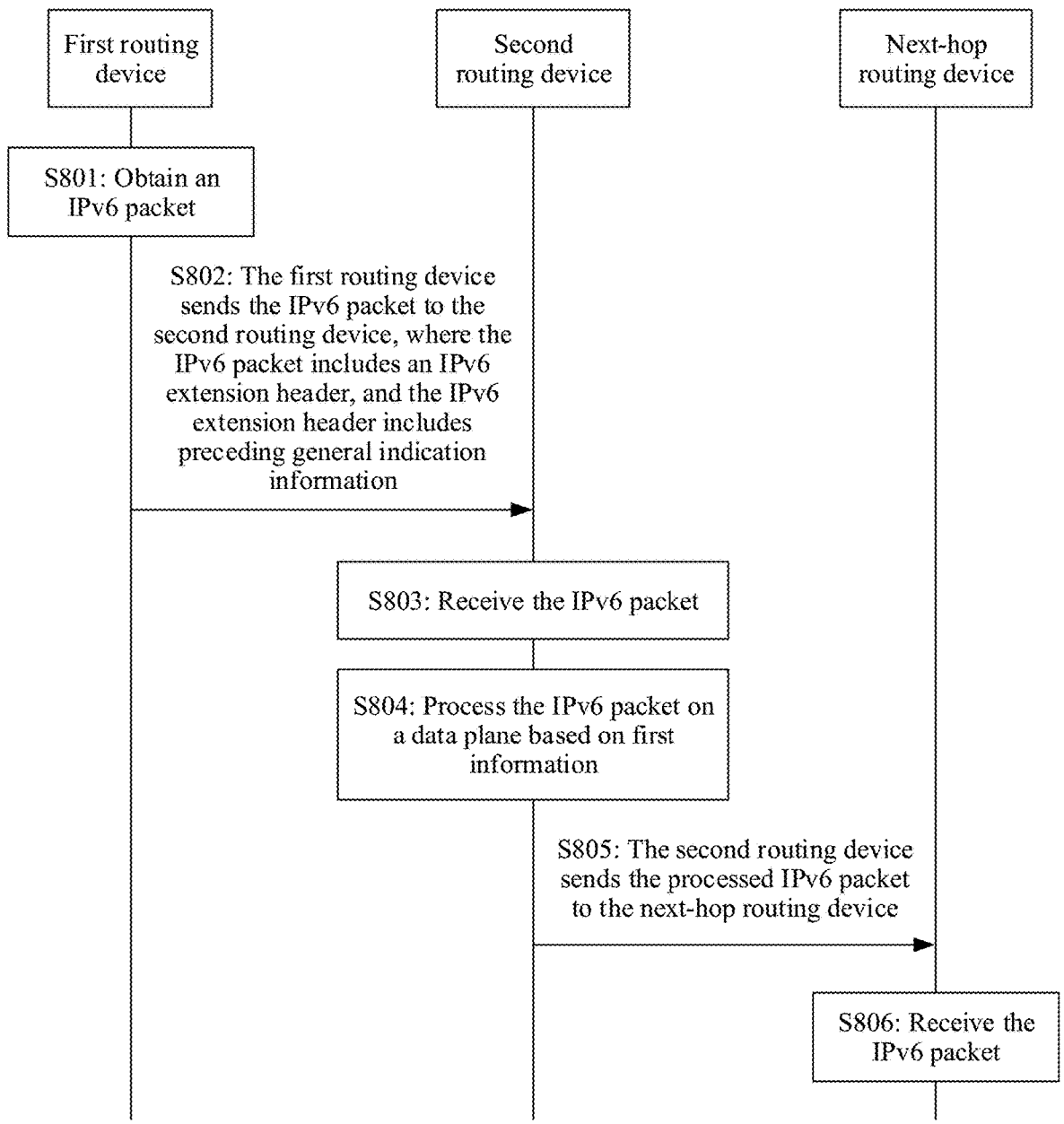
FIG. 8 is a schematic flowchart of an IPv6 packet processing method according to an embodiment of this application.

FIG. 8 is a schematic flowchart of an IPv6 packet processing method according to an embodiment of this application. The method includes step S801 to step S804.

Step S801: A first routing device obtains an IPv6 packet.

The IPv6 packet includes an IPv6 basic header and an IPv6 extension header, and the IPv6 extension header includes preceding general indication information and at least one TLV option. For example, the IPv6 extension header may be an HBH or a DOH, or may be an IPv6 extension header of another type. This is not limited in this application.

The first routing device may receive an IP packet from a user side, encapsulate an IPv6 header into the IP packet, where the IPv6 header includes an IPv6 basic header and an IPv6 extension header, and add preceding general indication information to the IPv6 extension header, to obtain the IPv6 packet. Alternatively, the first routing device may receive an IPv6 packet from a user side or another routing device, and add an IPv6 extension header that includes preceding general indication information to the IPv6 packet, or add preceding general indication information to an original IPv6 extension header of the IPv6 packet, to obtain the IPv6 packet that includes the preceding general indication information. Alternatively, the first routing device may receive, from a user side or another routing device, an IPv6 packet that includes an IPv6 extension header, and the IPv6 extension header carries preceding general indication information. The preceding general indication information may be added before the first routing device receives the IPv6 packet, or may be added by the first routing device to the IPv6 extension header.

The preceding general indication information includes first information, and the first information is used to indicate to process the IPv6 packet only on a data plane of a routing device and not to send the IPv6 packet to a CPU. The first indication may also be referred to as indication information "require data plane processing", or may be referred to as a data plane (DP) processing indication for short. In this way, a problem of relatively low packet processing efficiency caused by sending an IPv6 packet that includes an HBH or a DOH to a CPU in the conventional technology can be avoided.

The preceding general indication information may further include information related to the at least one TLV option, for example, a function, a quantity, and a type of the TLV option. In an example, the preceding general indication information may include one or more of second information, third information, and fourth information. The second information is used to indicate a function or a type of the at least one TLV option in the IPv6 extension header, or a function or a type of a primary TLV option in the at least one TLV option in the IPv6 extension header. The third information is used to indicate a function or a type of a secondary TLV option in the at least one TLV option in the IPv6 extension header. The fourth information is used to indicate a quantity of the at least one TLV option in the IPv6 extension header. In some embodiments of this application, the second information may also be referred to as function indication information, the third information may also be referred to as parameter indication information, and the fourth information may also be referred to as TLV Number indication information.

For example, if the at least one TLV option included in the IPv6 extension header is a single-type TLV option, the preceding general indication information may include the second information (that is, the function indication information), and the second information is used to indicate a function or a type of the single-type TLV option. If the IPv6 extension header includes a primary-type TLV option and a secondary-type TLV option, in addition to the second information (that is, the function indication information), the preceding general indication information may further include the third information (that is, the parameter indication information). The second information and the third information are respectively used to indicate a function or a type of the primary TLV option and a function or a type of the secondary TLV option. In addition, the preceding general indication information may further include the fourth information, and the fourth information is used to indicate a quantity of to-be-processed TLV options in the IPv6 extension header.

Therefore, the one or more of the second information, the third information, and the fourth information are carried in the preceding general indication information, so that a subsequent routing device can determine, based on the preceding general indication information, whether to support processing of the IPv6 extension header, thereby avoiding a problem of discarding the IPv6 packet or sending the IPv6 packet to the CPU only when it is determined that processing of the IPv6 extension header is not supported in a process of traversing the at least one TLV option, and effectively improving processing efficiency of the IPv6 packet.

It should be understood that, in some embodiments of this application, if the preceding general indication information includes the first information but does not include the one or more of the second information, the third information, and the fourth information, the subsequent routing device may also determine to process the IPv6 packet on the data plane, and traverse the at least one TLV option in the IPv6 extension header.

In a specific implementation, the first information may be further used to indicate that the IPv6 packet also needs to be processed on the data plane of the routing device when processing the IPv6 extension header is not supported. In this case, processing the IPv6 packet on the data plane may be ignoring the IPv6 extension header and continuing to forward the IPv6 packet, or directly discarding the IPv6 packet on the data plane.

That processing of the IPv6 extension header is not supported in some embodiments of this application may mean that processing of a specific function or type in at least one TLV option is not supported, and/or processing of a primary TLV or a secondary TLV of a specific type is not supported, and/or processing of a quantity of specific TLV options is not supported, and/or the like. This is not limited in this application.

Optionally, the preceding general indication information may further include fifth information, and the fifth information is used to indicate to ignore the IPv6 extension header and continue to forward the IPv6 packet based on a destination address, or discard the IPv6 packet on the data plane when the data plane of the routing device does not support processing of the at least one TLV option in the IPv6 extension header. In specific implementation, a value in the fifth information may be used to indicate whether to ignore the IPv6 extension header or discard the IPv6 packet. For example, a value 1 indicates to ignore the IPv6 extension header, and a value 0 indicates to discard the IPv6 packet.

In addition, whether to ignore the IPv6 extension header or discard the IPv6 packet may be checked by checking whether the preceding general indication information includes the fifth information. For example, when the preceding general indication information includes the fifth information, it may indicate that the IPv6 extension header may be ignored and the IPv6 packet may continue to be forwarded; or when the preceding general indication information does not include the fifth information, it may indicate that the IPv6 packet may be discarded. Therefore, the fifth information may also be referred to as indication information "ignore the IPv6 extension header" or a K indication for short. That is, in this specific implementation, the fifth information is used to indicate to ignore the IPv6 extension header and continue to forward the packet. Correspondingly, if the preceding general indication information does not include the fifth information, it indicates that the routing device cannot ignore the IPv6 extension header. In this case, if the data plane of the routing device does not support processing of the at least one TLV option, the IPv6 packet is discarded.

Optionally, the preceding general indication information may further include sixth information, and the sixth information is used to indicate to send an ICMP message to a source address of the IPv6 packet when the IPv6 packet is discarded. The sixth information may also be referred to as an indication "send the ICMP message" or an I indication for short. It should be further understood that, in some embodiments of this application, specific information that is in the second information, the third information, the fourth information, the fifth information, and the sixth information and that is included in the preceding general indication information may be set by the first routing device based on a service requirement. Content of the preceding general indication information in the IPv6 extension header may vary with a service scenario. For details, refer to descriptions in the following specific service scenario embodiments.

The preceding general indication information in some embodiments of this application may be included in a preceding general header (PGH) in the IPv6 extension header, and the preceding general header is located before the at least one TLV option in the IPv6 extension header. In this way, before traversing the at least one TLV option in the IPv6 extension header, the routing device may determine, based on the preceding general indication information, to process the IPv6 packet on the data plane and whether the data plane supports processing of the at least one TLV option in the IPv6 extension header.

Further, the preceding general header in some embodiments of this application may have a plurality of possible implementations. For example, the preceding general header may be a fixed header of the IPv6 extension header, or may be one piece of preceding general TLV in the IPv6 extension header; or the preceding general header and the at least one TLV option may be included in one piece of preceding general TLV in the IPv6 extension header, that is, the preceding general header and the at least one TLV option jointly form one piece of preceding general TLV.

Figure 9:
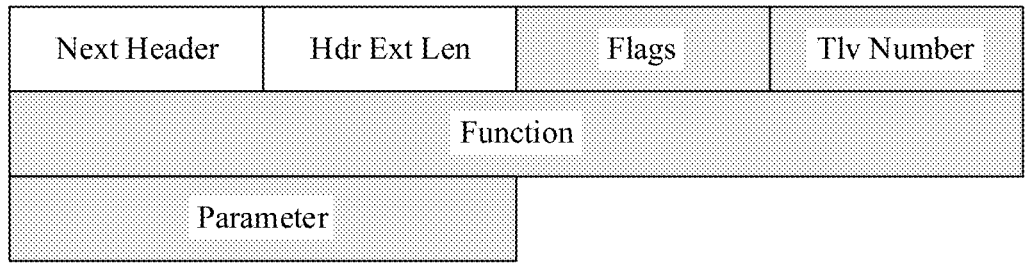
FIG. 9 is a schematic diagram of a structure of an IPv6 extension header according to an embodiment of this application.

FIG. 9 shows a possible structure of an IPv6 extension header according to an embodiment of this application. In the IPv6 extension header, a preceding general header is a fixed header of the IPv6 extension header, and is located after an Hdr Ext Len field in the IPv6 extension header and before at least one TLV option. In an example, as shown in FIG. 9, the preceding general header may include a Flags field, a Function field, a Parameter field, and a TLV Number field. The Flags field may include one or more of first information, fifth information, and sixth information, the Function field may include second information, the Parameter field may include third information, and the TLV Number field may include fourth information.

In an example, a flags field of a preceding general header in an IPv6 extension header of an IPv6 packet may include only first information, but does not include fifth information and sixth information, or may include first information, fifth information, and sixth information. In another example, a flags field of a preceding general header in an IPv6 extension header of an IPv6 packet may include first information and fifth information. In another example, a flags field of a preceding general header in an IPv6 extension header of an IPv6 packet may include first information and sixth information.

Figure 10:
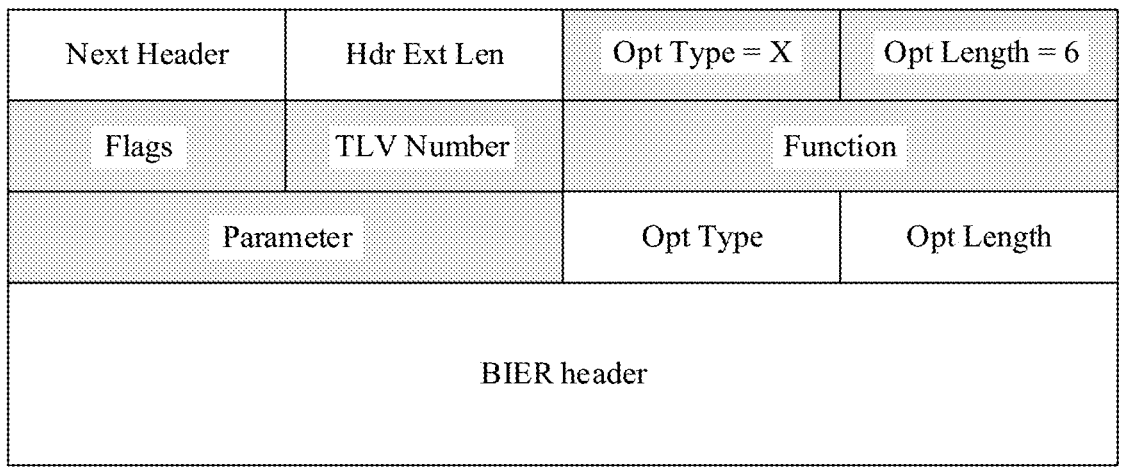
FIG. 10 is another schematic diagram of a structure of an IPv6 extension header according to an embodiment of this application.

FIG. 10 shows another possible structure of an IPv6 extension header according to an embodiment of this application. In the IPv6 extension header, a preceding general header is one piece of preceding general TLV in the IPv6 extension header, and the preceding general TLV is located after an Hdr Ext Len field in the IPv6 extension header and before at least one TLV option. That is, the preceding general header is also a structure of TLV, that is, the preceding general TLV. A V (value) part of the preceding general TLV includes a Flags field, a Function field, a Parameter field, and a TLV Number field. The Flags field may include one or more of first information, fifth information, and sixth information, the Function field may include second information, the Parameter field may include third information, and the TLV Number field may include fourth information.

In addition, as shown in FIG. 10, the preceding general TLV may further include an opt type field and an opt length field, and the opt type field and the opt length field are located before the Flags field, the Function field, the Parameter field, and the TLV Number field. The opt type field is a T (type) part of the TLV option, and is used to indicate a type of the TLV option. In FIG. 10, opt type=X indicates that the TLV option is of an X type. The opt length field is a length of a V (value) part of the TLV option. In FIG. 10, opt length=6 indicates that the V part of the TLV option is 6 bytes, that is, a sum of the Flags field, the TLV Number field, the Function field, and the Parameter field is 6 bytes.

Figure 11:
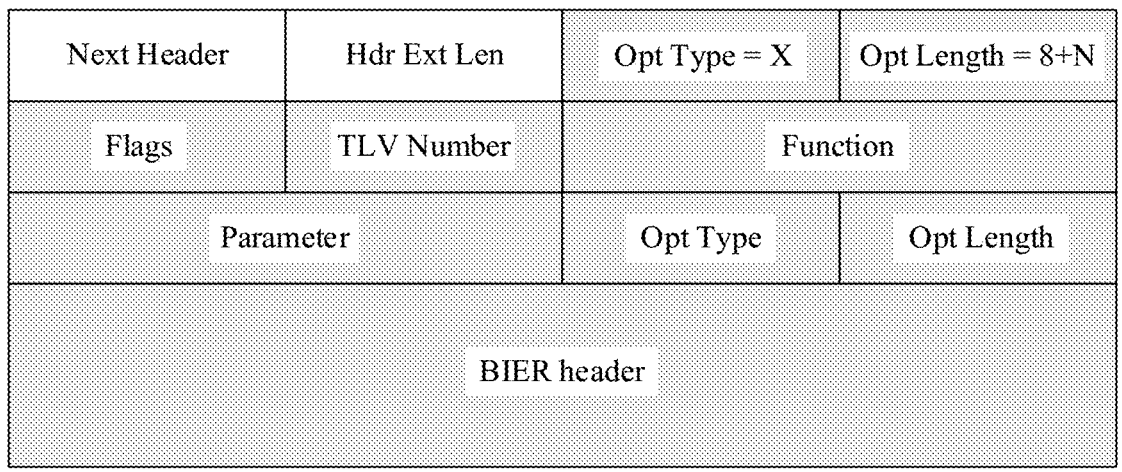
FIG. 11 is still another schematic diagram of a structure of an IPv6 extension header according to an embodiment of this application.

FIG. 11 shows still another possible structure of an IPv6 extension header according to an embodiment of this application. In the IPv6 extension header, both a preceding general header and at least one TLV option in the IPv6 extension header are located in one piece of preceding general TLV, and the preceding general header is located before the at least one TLV option. That is, the preceding general TLV is also a structure of TLV, and both the preceding general header and the at least one TLV option are nested in a V (value) part of the TLV option. The preceding general TLV further includes an opt type field and an opt length field, and the opt length field is used to indicate a total length of the preceding general header and the at least one TLV option located after the preceding general header. Similarly, the preceding general header also includes a Flags field, a Function field, a Parameter field, and a TLV Number field. The Flags field may include one or more of first information, fifth information, and sixth information, the Function field may include second information, the Parameter field may include third information, and the TLV Number field may include fourth information.

It should be understood that the preceding general header in some embodiments of this application may be implemented based on an existing HBH, or may be implemented based on a new HBH. This is not limited in this application. The same is true for a DOH and an IPv6 extension header of another type. In addition, a sequence of the fields in the preceding general header is not limited in some embodiments of this application. For example, as shown in FIG. 9 to FIG. 11, setting may be performed in a sequence of the Flags field, the Function field, the Parameter field, and the TLV Number field, or setting may be performed in a sequence of the Flags field, the TLV Number field, the Function field, and the Parameter field, or setting may be performed in another sequence.

In an example, the IPv6 extension header is a DOH for IPv6, and the preceding general indication information is added to the DOH based on an existing DOH, so that the DOH can be quickly processed on the data plane. It should be understood that the preceding general indication information may replace preceding indication information in a DA field in the IPv6 basic header of the IPv6 packet, or may be used together with preceding indication information in a DA field in the IPv6 basic header. When processing the DOH, the routing device first checks the preceding general indication information in the DOH.

Step S802: The first routing device sends the IPv6 packet to a next-hop routing device, where the next-hop routing device is a next-hop routing device of the first routing device, that is, a second routing device.

Step S803: The second routing device receives the IPv6 packet from a previous-hop routing device.

The previous-hop routing device of the second routing device may be the first routing device, or may be another second routing device.

Step S804: The second routing device processes the IPv6 packet on the data plane based on the first information.

Step S805: The second routing device sends the processed IPv6 packet to a next-hop routing device. The next-hop routing device of the second routing device may be a third routing device, or may be another second routing device. If there is only one second routing device on a path from the first routing device to the third routing device in the network, the next-hop routing device of the second routing device is the third routing device.

Step S806: The next-hop routing device receives the IPv6 packet, where the next-hop routing device may be the another second routing device or the third routing device.

The following describes step S804 in detail with reference to the accompanying drawings.

FIG. 12A to FIG. 12D show a processing procedure performed after a second routing device receives an IPv6 packet according to an embodiment of this application. The processing procedure starts from FIG. 12A. In step S1201, the second routing device receives an IPv6 packet. Then, in step S1202, the second routing device determines whether the IPv6 packet includes an IPv6 extension header, for example, may determine whether the IPv6 packet includes an HBH for IPv6 or a DOH for IPv6, that is, whether a Next Header field in an IPv6 basic header indicates an HBH or a DOH. If a determining result in step S1202 is that the IPv6 packet does not include the IPv6 extension header, in step S1203, the second routing device performs a procedure 1, that is, performs table lookup and forwarding based on a destination address of the IPv6 packet, and forwards the IPv6 packet to a next-hop routing device.

If the determining result in step S1202 is that the IPv6 packet includes the IPv6 extension header, in step S1204, the second routing device may further determine whether the IPv6 extension header includes a preceding general header PGH, and whether the preceding general header PGH includes first information used to indicate to process the IPv6 packet on a data plane. If a determining result in step S1204 is that the IPv6 extension header does not include preceding general indication information, or preceding general indication information in the IPv6 extension header does not include the first information, the second routing device may continue to perform a procedure 2 shown in FIG. 12B. That is, the second routing device traverses TLV options in the IPv6 extension header one by one. In step S1205, the second routing device determines whether traversal of the TLV options is completed. If traversal of the TLV options is not completed, in step S1206, the second routing device determines whether processing of each TLV option on the data plane is supported. If the second routing device supports processing of the TLV option on the data plane, in step S1207, the second routing device processes the TLV option on the data plane, and continues to traverse a next TLV option after the processing is completed. After traversal of all the TLV options is completed, the second routing device may perform the procedure 1, that is, perform table lookup and forwarding based on the destination address of the IPv6 packet, and forwards the IPv6 packet to the next-hop routing device. If the second routing device does not support processing of the TLV option on the data plane, in step S1208, the second routing device discards the IPv6 packet on the data plane, or sends the IPv6 packet to a CPU for processing. After processing the IPv6 packet, the CPU may continue to forward the IPv6 packet, or may discard the IPv6 packet. This is not limited herein.

Figure 12A:
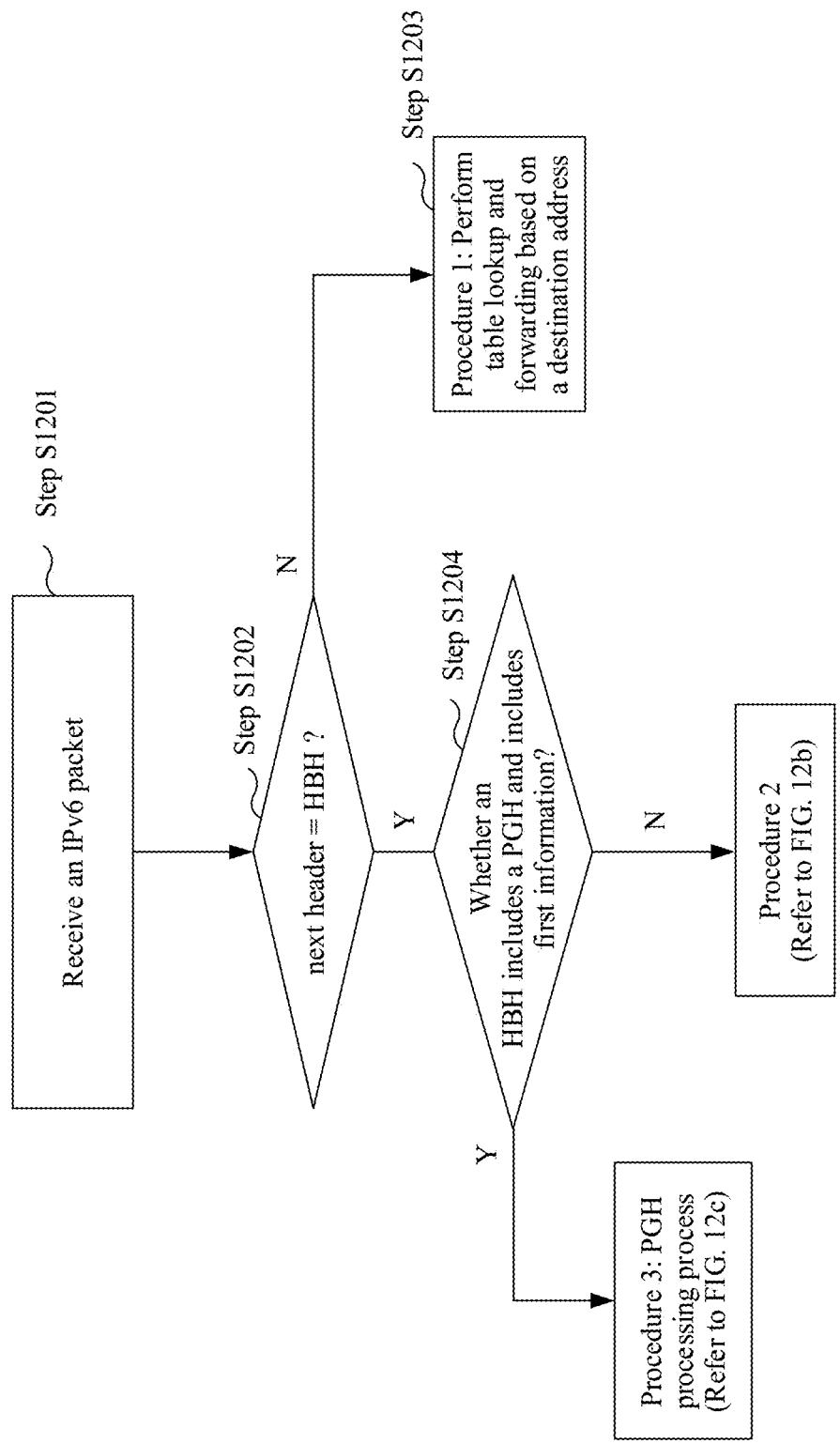
FIG. 12A to FIG. 12D are schematic flowcharts of processing performed after a second routing device receives an IPv6 packet according to an embodiment of this application.
Figure 12B:
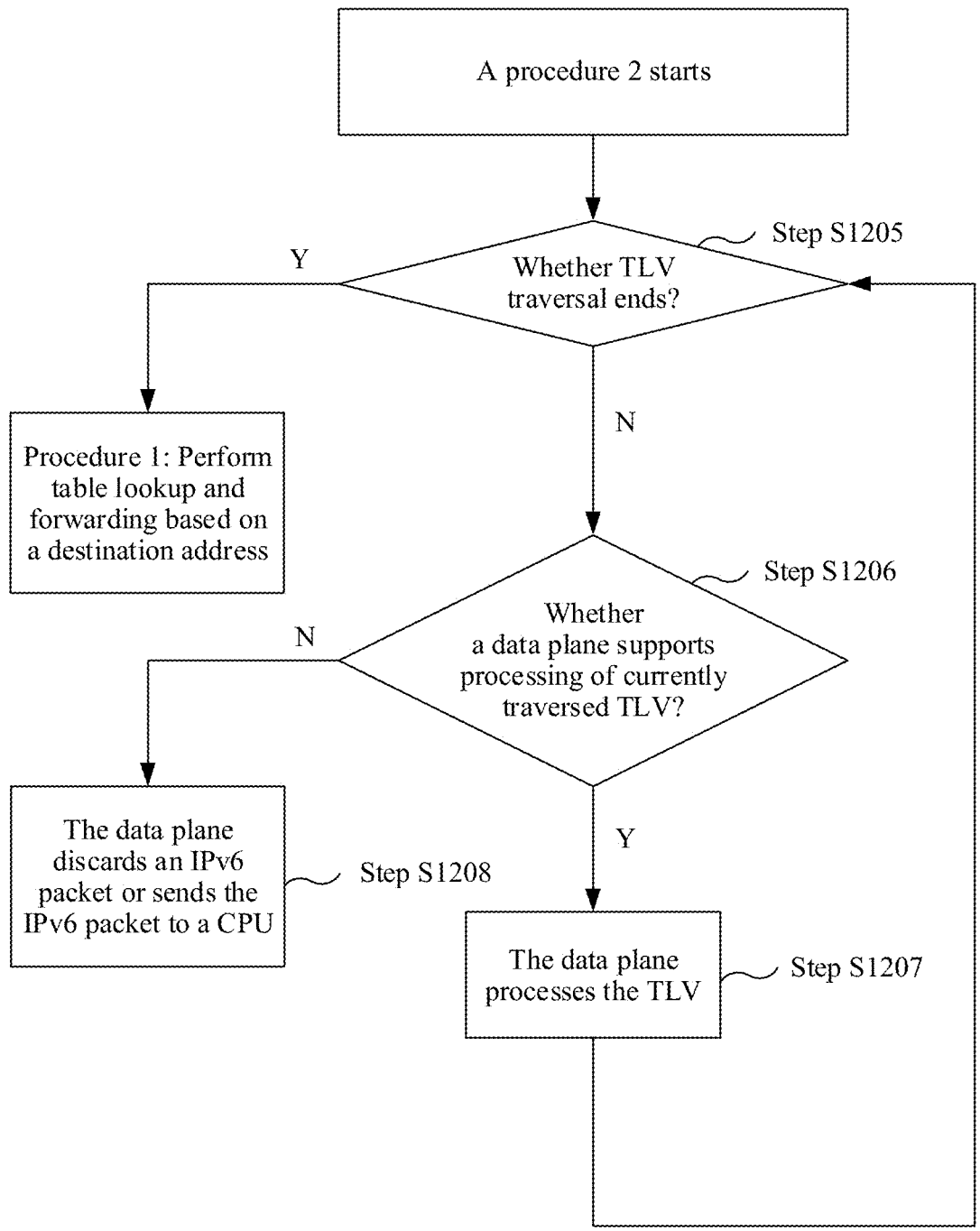
Figure 12C:
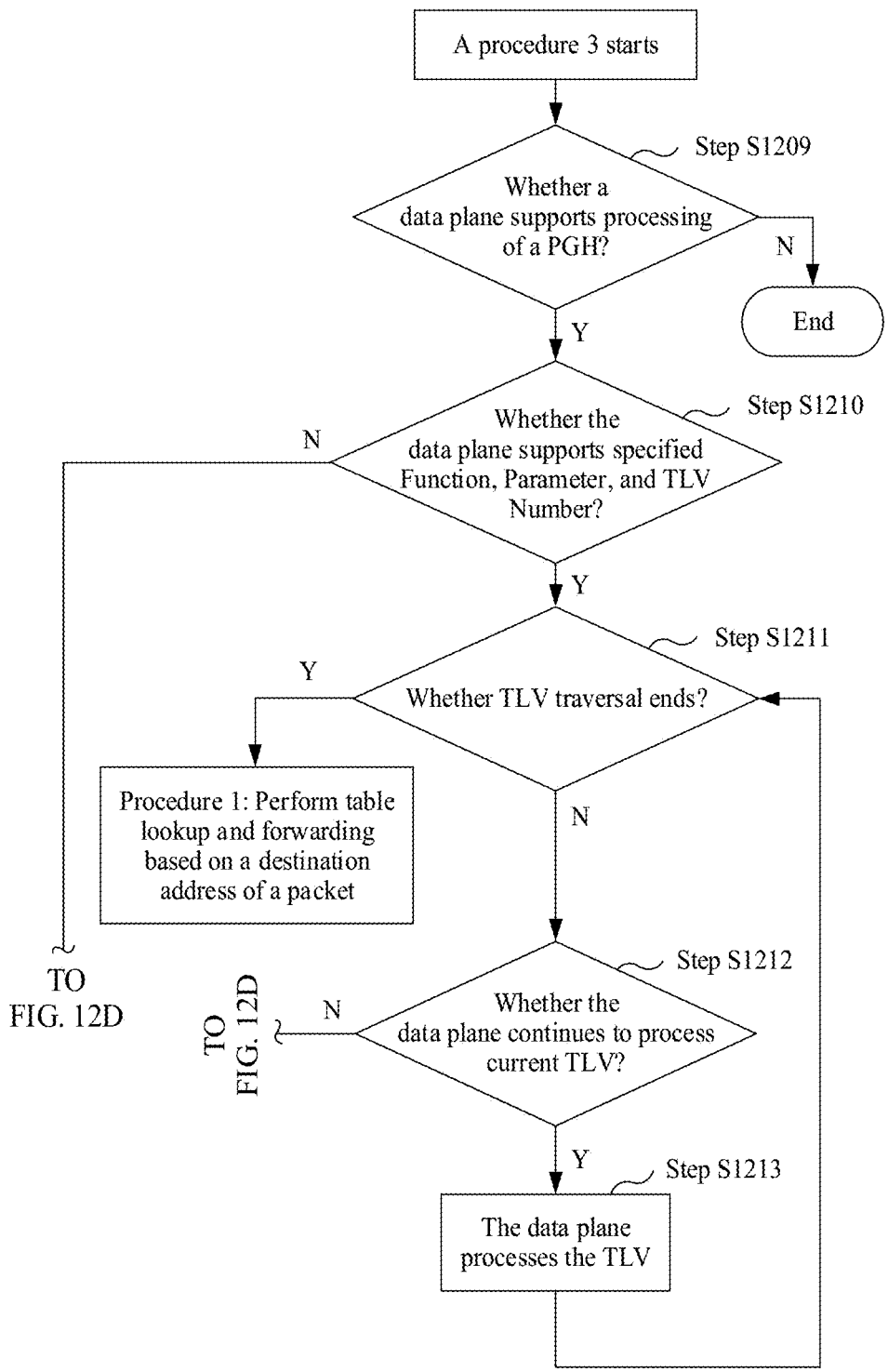
Figure 12D:
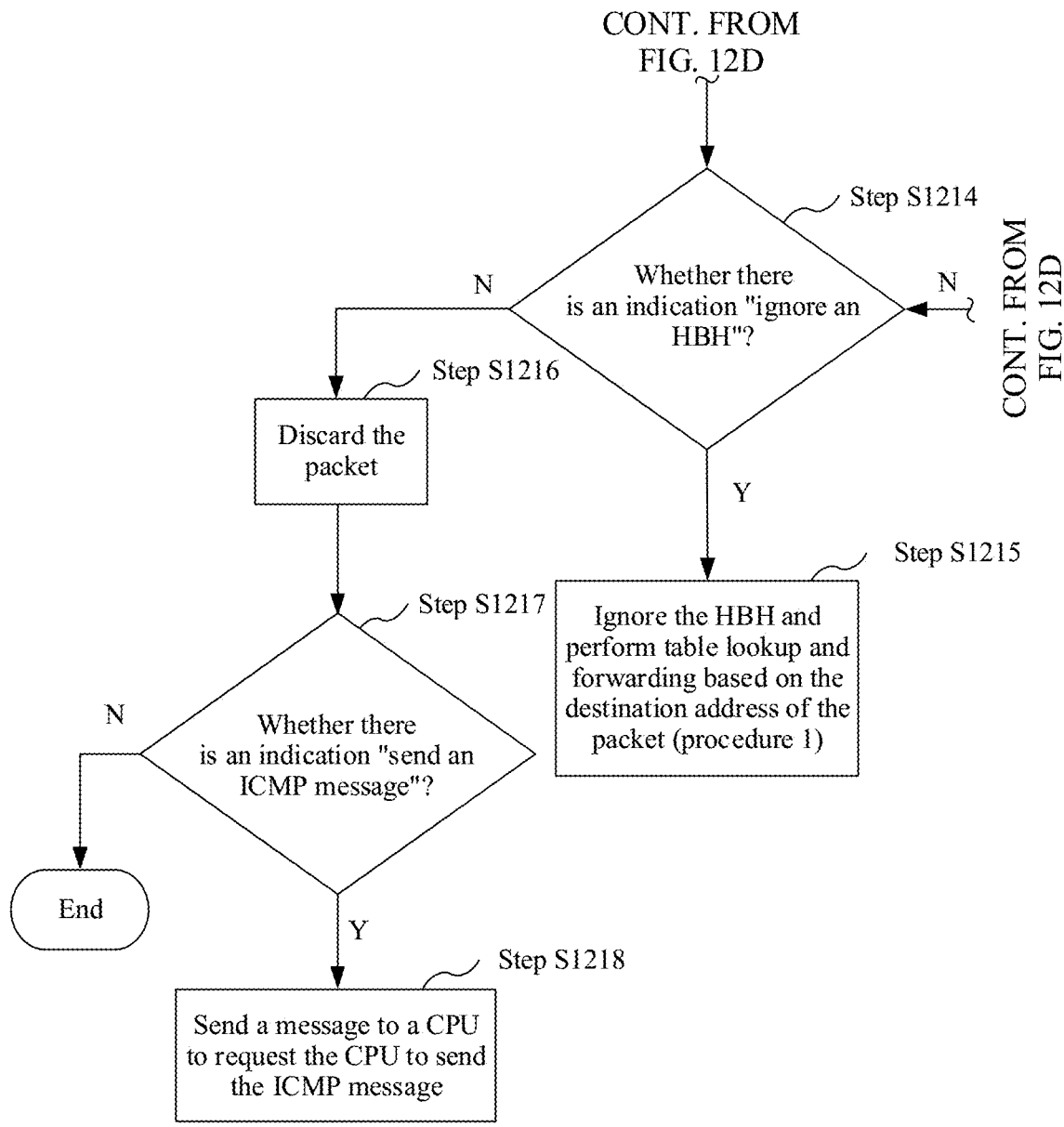

If the determining result in step S1204 is that the IPv6 extension header includes the preceding general indication information, and the preceding general indication information includes the first information, the second routing device may process the IPv6 packet on the data plane according to the indication of the first information, as shown in a procedure 3 in FIG. 12C and FIG. 12D. In an example, in the procedure 3, in step S1209, the second routing device first determines whether the data plane supports processing of the preceding general header. If processing of the preceding general header is supported, step S1210 is performed, that is, the second routing device may further determine, based on one or more of second information, third information, and fourth information included in preceding general indication information, whether the data plane of the second routing device supports processing of at least one TLV option in the IPv6 extension header. If the second routing device determines, based on the one or more of the second information, the third information, and the fourth information included in the preceding general indication information, that the data plane supports processing of the at least one TLV option in the IPv6 extension header, in step S1211 to step S1213, the second routing device may traverse the at least one TLV option on the data plane, and separately perform processing. After traversal of all the TLV options is completed, the second routing device may perform the procedure 1, that is, perform table lookup and forwarding based on the destination address of the IPv6 packet, and forwards the IPv6 packet to the next-hop routing device. If the preceding general indication information does not include the one or more of the second information, the third information, and the fourth information, the second routing device may also traverse the at least one TLV option in the IPv6 extension header, and separately perform processing.

If the second routing device determines, in a process of traversing the at least one TLV option in step S1212, that the data plane does not support processing of any TLV option in the at least one TLV option, or a quantity of currently processed TLV options exceeds a maximum quantity of TLVs that can be processed by the data plane of the second routing device, and the second routing device cannot continue to process the current TLV option, step S1214 is performed, that is, the second routing device further determines whether the preceding general indication information includes fifth information. If the preceding general indication information includes the fifth information, in a specific implementation, in step S1215, the second routing device may ignore the IPv6 extension header, perform table lookup based on the destination address of the IPv6 packet, and forward the IPv6 packet to the next-hop routing device. Otherwise, if the preceding general indication information does not include the fifth information, in step S1216, the second routing device may discard the IPv6 packet on the data plane. When the packet is discarded, further, in step S1217, the second routing device may determine whether the preceding general indication information includes sixth information, that is, indication information used to indicate that an ICMP message needs to be sent to a source address of the IPv6 packet when the IPv6 packet is discarded. If the preceding general indication information includes the sixth information, in step S1218, the second routing device may send the ICMP message to the source address of the IPv6 packet through the CPU after discarding the IPv6 packet. Otherwise, if the preceding general indication information does not include the sixth information, the processing procedure ends, and no further processing is performed.

If a determining result in step S1210 is that the second routing device determines, based on the one or more of the second information, the third information, and the fourth information included in the preceding general indication information, that the data plane does not support processing of the at least one TLV option in the IPv6 extension header, step S1214 is performed, that is, the second routing device may further determine whether the preceding general indication information includes fifth information. If the preceding general indication information includes the fifth information, in a specific implementation, in step S1215, the second routing device may ignore the IPv6 extension header, perform table lookup based on the destination address of the IPv6 packet, and forward the IPv6 packet to the next-hop routing device. Otherwise, if the preceding general indication information does not include the fifth information, in step S1216, the second routing device may discard the IPv6 packet on the data plane. When the packet is discarded, further, in step S1217, the second routing device may determine whether the preceding general indication information includes sixth information. If the preceding general indication information includes the sixth information, in step S1218, after discarding the IPv6 packet, the second routing device may send the ICMP message to the source address of the IPv6 packet through the CPU. Otherwise, if the preceding general indication information does not include the sixth information, the processing procedure ends, and no further processing is performed.

It should be noted that the data plane of the second routing device sends the ICMP message to the source address of the IPv6 packet through the CPU after discarding the IPv6 packet such that the data plane (for example, an ASIC chip) of the second routing device sends, to the CPU, a first message used to request the CPU to send the ICMP message, and attaches the IPv6 packet to be discarded to the first message. The first message may be understood as an ICMP advertisement sent by the data plane to the CPU. In this way, after receiving the first message, the CPU may determine, based on the IPv6 packet in the first message, a manner of sending the ICMP message to the source address of the IPv6 packet, for example, determine, based on the IPv6 packet to be discarded, an encapsulation manner of a packet in which the ICMP message is located. It should be understood that, although the first message carries the IPv6 packet to be discarded, this is different from the conventional technology in which the IPv6 packet is sent to the CPU for processing, because the CPU does not process or forward the IPv6 packet in the first message after receiving the first message.

It can be learned that, because the preceding general indication information in the IPv6 extension header may include the first information, processing performed by the routing device on the IPv6 extension header may be performed on the data plane, including processing of the preceding general indication information (that is, the preceding general header) in the IPv6 extension header, so as to avoid a problem that the routing device may send the IPv6 packet to the CPU. Further, the preceding general indication information in the IPv6 extension header may include the one or more of the second information, the third information, and the fourth information. Therefore, before traversing the at least one TLV option in the IPv6 extension header, the routing device first determines, based on the preceding general indication information, whether the data plane supports processing of the IPv6 extension header. In this way, when the data plane of the routing device does not support processing of types, functions, or quantities of some TLV options in the IPv6 extension header, the IPv6 packet can be quickly processed on the data plane, thereby avoiding a problem that the routing device invalidly traverses the TLV option.

It should be understood that a type and a quantity of an IPv6 extension header included in the IPv6 packet are not limited in some embodiments of this application. One IPv6 packet may include one IPv6 extension header, or may include a plurality of IPv6 extension headers. In addition, types of the plurality of IPv6 extension headers may be the same or different. When one IPv6 packet includes a plurality of IPv6 extension headers, the routing device may process the IPv6 extension headers one by one according to the foregoing method procedure in a sequence of the IPv6 extension headers in the IPv6 packet.

The following describes in detail the IPv6 packet processing method provided in the embodiments of this application by using three specific service scenarios. It should be understood that both the network structure shown in FIG. 7 and the IPv6 packet processing method shown in FIG. 8 may be applied to the following three specific service scenarios, and details are not described herein.

Service Scenario 1: Flow Classified

Flow classified is to classify services that enter a differentiated service diffserv domain, so that the services can be correspondingly processed on a network. Generally, packets may be classified based on a 5-tuple of an IP packet (a source address, a source port number, a protocol number, a destination address, and a destination port number), and an operation such as traffic shaping may be performed on the classified packets.

In the flow classified service scenario, an IPv6 extension header in an IPv6 packet may be an HBH. The HBH includes a preceding general header and a classified flow option classified flow option, and the preceding general header is located after an Hdr Ext Len field in the HBH and before the classified flow option. It should be noted that the HBH may be implemented based on a type of an existing HBH, that is, a preceding general header is added based on an existing HBH, to carry preceding general indication information. Alternatively, the HBH may be implemented based on a type of a new HBH, that is, a preceding general header is added based on a new type of HBH, to carry the preceding general indication information. This is not limited in this application.

FIG. 13 is a schematic diagram of a structure of an HBH in a flow classified service scenario according to an embodiment of this application. In the HBH, a preceding general header is a fixed header of the HBH, and is located after an Hdr Ext Len field of the HBH and before a classified flow option.

As shown in FIG. 13, the preceding general header includes a Flags field, a TLV Number field, a Function field, and a Parameter field. In an example, the Flags field includes first information used to indicate to process the HBH on a data plane, and fifth information used to ignore the HBH and continue to forward an IPv6 packet when processing of the HBH is not supported. Optionally, the Flags field may further include sixth information used to send an ICMP message to a source address of the IPv6 packet when the IPv6 packet is discarded. The TLV Number field is used to indicate a quantity of TLV options included in the HBH after the preceding general header. In this example, when a value of the TLV Number field is 1, it indicates that the HBH includes one TLV option after the preceding general header, that is, the subsequent classified flow option. In another example, the value of the TLV Number field may alternatively be 0. It indicates that the TLV Number field is not provided, that is, fourth information is optional. The Function field is used to indicate a function of the HBH. In this example, when a value of the Function field is 12, it indicates that a function of a subsequent TLV option is flow classified. When a value of the Parameter field is not 0, it indicates a further sub-function of the flow classified function. In this example, when the value of the Parameter field is 0, it indicates that there is no further sub-function.

The flow classified option is a TLV structure, and includes an opt type field, an opt length field, and a flow identifier flowID field. In this example, a value of the opt type field is a flow classified option type, a value of the opt length field is 4, the flowID field is used to indicate an identifier of a flow to which the IPv6 packet belongs, and the field occupies 4 bytes. A value of the field may be obtained through mapping from a 5-tuple of an inner IP packet, and a specific mapping rule may be configured by a first routing device. For example, the first routing device configures the flow with the 5-tuple (Src=192.168.1.100, Dst=192.168.2.200, Proto=TCP, Sport=0, Dport=80) to be mapped to FlowID=1234.

In this way, the first routing device on the network may receive an IP packet from a user side, encapsulate an IPv6 basic header and an HBH of the structure shown in FIG. 13 into the IP packet, to obtain the IPv6 packet, and further send the IPv6 packet to a second routing device. In a flow classified application scenario, the first routing device needs to identify a complex flow in the IP packet, and identify the complex flow in an outer IPv6 extension header (that is, a classified flow option in the HBH), so that each second routing device that forwards the IPv6 packet on the network can perform corresponding processing on the IPv6 packet based on the outer IPv6 extension header.

After receiving the IPv6 packet, the second routing device first checks a Next Header field in the IPv6 basic header and determines that next head=0, and then checks the HBH and determines that the HBH includes a preceding general header (for example, preceding general indication information). The second routing device supports processing of the preceding general header in the HBH on the data plane. Therefore, the second routing device continues to perform processing based on logic shown in pseudocode in FIG. 14.

In an example, it is determined whether the Flags field includes first information used to indicate to process the IPv6 packet on the data plane. If the Flags field includes the first information, it is further determined whether a type and/or a quantity of a TLV option indicated in the Function field and the TLV Number field are/is within a processing capability range of the data plane of the second routing device. If a determining result is that the type and/or the quantity of the TLV option are/is within the processing range of the second routing device, the second routing device may process, on the data plane based on the value of the Function field and/or the value of the TLV Number field, the TLV option (for example, the classified flow option) located after the preceding general header in the HBH. If the determining result is that the type and/or the quantity of the TLV option are/is not within the processing capability range of the data plane of the second routing device, the second routing device may ignore the HBH and continue to forward the IPv6 packet, or the second routing device may discard the IPv6 packet on the data plane. For example, when the Flags field includes fifth information used to indicate to ignore the HBH and continue to forward the IPv6 packet, the second routing device may ignore the HBH and continue to forward the IPv6 packet. Alternatively, the second routing device may discard the IPv6 packet when the Flags field does not include the fifth information, and further determine, based on whether the Flags field includes sixth information, whether to send an ICMP message to a source address of the IPv6 packet. If the sixth information is included, the ICMP message is sent, or if the sixth information is not included, the ICMP message is not sent. In this way, for a case in which "the data plane does not support a specific function or TLV number" or "the data plane does not support any TLV processing of the HBH", the IPv6 packet may be quickly ignored without waiting for traversal of the one or more TLV options.

In some embodiments of this application, the second routing device supports processing of the preceding general header, and the Flags field in the preceding general header includes the first information. Therefore, processing logic used when "the Flags field does not include the first information" shown in FIG. 14 is not used. It should be noted that, in this example, the Flags field includes indication information "require data plane processing". Therefore, this step and subsequent steps are not performed, and the IPv6 packet is not sent to the CPU for processing. Only when the routing device does not support processing of the preceding general header, the routing device may traverse one or more TLV options after the preceding general header according to the method described in RFC 8200, for example, send the IPv6 packet to the CPU for processing.

It should be understood that the structure of the HBH shown in FIG. 13 is merely an example. In the flow classified service scenario, the preceding general header in the HBH may alternatively be in the structure shown in FIG. 10 or FIG. 11. This is not limited in this application. That is, the preceding general header may alternatively be preceding general TLV in the HBH, or the preceding general header and the classified flow option may alternatively be nested in a same TLV structure.

It can be learned that, in some embodiments of this application, the first information "require data plane processing" and the fifth information "ignore the HBH" are set in the Flags field in the preceding general header, type information "flow classified" is set in the Function field, and one piece of classified flow option TLV is added after the preceding general header. When the second routing device supports processing of the preceding general header on the data plane, but the data plane does not support function=flow classified, the IPv6 packet can be quickly processed on the data plane, and is not sent to the CPU.

Service Scenario 2: Path Maximum Transport Unit (PMTU)

In the PMTU service scenario, an IPv6 extension header in an IPv6 packet may be an HBH. The HBH includes a preceding general header and an IPv6 minimum path MTU hop-by-hop option (IPv6 minimum path MTU hop-by-hop option), and the preceding general header is located after an Hdr Ext Len field of the HBH and before the IPv6 minimum path MTU hop-by-hop option. It should be noted that the HBH may be implemented based on a type of an existing HBH, that is, a preceding general header is added based on an existing HBH, to carry preceding general indication information. Alternatively, the HBH may be implemented based on a type of a new HBH, that is, a preceding general header is added based on a new type of HBH, to carry the preceding general indication information. This is not limited in this application.

FIG. 15A to FIG. 15C are schematic diagrams of a structure of an HBH in a PMTU service scenario according to an embodiment of this application. In FIG. 15A, a preceding general header is a TLV structure in the HBH, and may be referred to as preceding general TLV. The preceding general header includes an opt type field, an opt length field, a Flags field, a TLV Number field, a Function field, and a Parameter field. The opt type field is used to indicate a type of the preceding general TLV. In this example, a value of the opt type field is 1. The opt length field is used to indicate a length of a V (value) part of the preceding general TLV. In this example, a value of the opt length field is 1. The Flags field includes first information used to indicate to process the HBH on a data plane, and fifth information used to ignore the HBH and continue to forward an IPv6 packet when processing of the HBH is not supported. Optionally, the Flags field may further include sixth information used to send an ICMP message to a source address of the IPv6 packet when the IPv6 packet is discarded. The TLV Number field is used to indicate a quantity of TLV options included in the DOH after the preceding general header. In this example, when a value of the TLV Number field is 1, it indicates that the HBH includes one TLV option after the preceding general header, that is, the subsequent IPv6 minimum path MTU hop-by-hop option. In another example, the value of the TLV Number field may alternatively be 0. It indicates that the TLV Number is not provided, that is, fourth information is optional. The Function field is used to indicate a function of the HBH. In this example, when a value of the Function field is 11, it indicates that a function of a subsequent TLV option is a PMTU. When a value of the Parameter field is not 0, it indicates a further sub-function of the PMTU function. In this example, when the value of the Parameter field is 0, it indicates that there is no further sub-function.

In FIG. 15B, a preceding general header is also a TLV structure, and may also be referred to as preceding general TLV. The preceding general header includes an opt type field, an opt length field, a value field, a Flags field, a TLV Number field, and a Parameter field. However, it should be noted that the first two bytes in the value part of the preceding general TLV are a value field defined in RFC 2711, and may be used as a function. For ease of description, the first two bytes may also be referred to as the Function field below, and the following four bytes are the Parameter, Flags, and TLV Number fields.

It should be noted that the value of the opt type field in the preceding general header may be newly applied for from the "Destination Options and Hop-by-Hop Options" registry of the IANA. For this, refer to https://www.iana.org/protocols. The value may alternatively be a defined value. For example, as shown in FIG. 15B, opt type=5 is defined in RFC 2711.

In addition, a sequence of the fields included in the preceding general header is different from the sequence of the fields shown in FIG. 15A. In other words, a sequence of the fields included in the preceding general header in some embodiments of this application may be flexibly set based on a requirement.

In FIG. 15C, a preceding general header is a fixed header of an HBH. Similarly, the preceding general header includes a Flags field, a TLV Number field, a Function field, and a Parameter field. The Flags field includes first information used to indicate to process the HBH on a data plane, and fifth information used to ignore the HBH and continue to forward an IPv6 packet when processing of the HBH is not supported. Optionally, the Flags field may further include sixth information used to send an ICMP message to a source address of the IPv6 packet when the IPv6 packet is discarded. When a value of the TLV Number field is 1, it indicates that the HBH includes one TLV option, that is, a subsequent IPv6 minimum path MTU hop-by-hop option. The Function field is used to indicate a PMTU service, and indicates that a function of the following TLV options is applied to the PMTU. A value of the Parameter field is 0.

It should be understood that the structure of the HBH shown in FIG. 15A to FIG. 15C is merely an example. In the flow classified service scenario, the preceding general header in the HBH may alternatively be in the structure shown in FIG. 11. This is not limited in this application. That is, the preceding general header may alternatively be nested in a same TLV structure as the IPv6 minimum path MTU hop-by-hop option. In FIG. 15A to FIG. 15C, the IPv6 minimum path MTU hop-by-hop option is also a TLV structure. The IPv6 minimum path MTU hop-by-hop option includes an opt type field, an opt length field, a min-PMTU field, a ret-PMTU field, and an R field. The min-PMTU field is used to indicate a minimum PMTU, and the ret-PMTU field is used to indicate a returned minimum PMTU.

In the service scenario, a first routing device, a second routing device, and a third routing device all support IPv6 packet forwarding and PMTU option processing. The first routing device may receive an IP packet from a user side, encapsulate an IPv6 basic header and an HBH of any structure shown in FIG. 15A to FIG. 15C into the IP packet, to obtain the IPv6 packet, and further send the IPv6 packet to the second routing device.

The second routing device may allow, by using a newly added configuration, the data plane to process the preceding general header. After receiving the IPv6 packet, the second routing device first checks a Next Header field in the IPv6 basic header and determines that next head=0, and then checks the HBH and determines that the HBH includes a preceding general header (for example, preceding general indication information). The second routing device supports processing of the preceding general header in the HBH on the data plane. Therefore, the second routing device may continue to perform processing based on logic shown in pseudocode in FIG. 16.

In an example, it is determined whether the Flags field includes first information used to indicate to process the IPv6 packet on the data plane. If the Flags field includes the first information, it is further determined whether a type and/or a quantity of a TLV option indicated in the Function field and the TLV Number field are/is within a processing capability range of the data plane of the second routing device. If a determining result is that the type and/or the quantity of the TLV option are/is within the processing range of the second routing device, the second routing device may process, on the data plane based on the value of the Function field and/or the value of the TLV Number field, the TLV option (for example, the IPv6 minimum path MTU hop-by-hop option) located after the preceding general header in the HBH. If the determining result is that the type and/or the quantity of the TLV option are/is not within the processing capability range of the data plane of the second routing device, the second routing device may ignore the HBH and continue to forward the IPv6 packet, or the second routing device may discard the IPv6 packet on the data plane. For example, when the Flags field includes fifth information used to indicate to ignore the HBH and continue to forward the IPv6 packet, the second routing device may ignore the HBH and continue to forward the IPv6 packet. Alternatively, the second routing device may discard the IPv6 packet when the Flags field does not include the fifth information, and further determine, based on whether the Flags field includes sixth information, whether to send an ICMP message to a source address of the IPv6 packet. If the sixth information is included, the ICMP message is sent, or if the sixth information is not included, the ICMP message is not sent. In this way, for a case in which "the data plane does not support a specific function or TLV number" or "the data plane does not support any TLV processing of the HBH", the IPv6 packet may be quickly ignored without waiting for traversal of the one or more TLV options.

In some embodiments of this application, the routing device supports processing of the preceding general header, and the Flags field in the preceding general header includes the first information. Therefore, processing logic used when the Flags field does not include the first information shown in FIG. 16 is not used, and the IPv6 packet is not sent to a CPU for processing. Only when the routing device does not support processing of the preceding general header, the routing device may traverse one or more TLV options after the preceding general header according to the method described in RFC 8200, for example, send the IPv6 packet to the CPU for processing.

It can be learned that, in some embodiments of this application, after the second routing device supports processing of the preceding general header, if the IPv6 packet includes a subsequent TLV type that cannot be processed on the data plane, the second routing device may perform fast data plane processing on the IPv6 packet without sending the IPv6 packet to the CPU, for example, may ignore the HBH and continue to forward the IPv6 packet, or discard the IPv6 packet. The ICMP message may be sent when the IPv6 packet is discarded. In this process, the ICMP message may be sent from the data plane to the CPU for processing by the CPU. The message may carry the IPv6 packet, but the CPU does not forward the IPv6 packet. "Require data plane processing" described above means that the IPv6 packet is forwarded or discarded on the data plane, but the ICMP message may not be sent on the data plane.

Service Scenario 3: Bit Index Explicit Replication (BIER) IPv6 Encapsulation (BIERv6)

In the BIERv6 service scenario, an IPv6 extension header in an IPv6 packet may be a DOH. The DOH includes a preceding general header and a BIER option, and the preceding general header is located after an Hdr Ext Len field in the DOH and before the BIER option. It should be noted that the DOH may be implemented based on a type of an existing DOH, that is, a preceding general header is added based on an existing DOH, to carry preceding general indication information. Alternatively, the DOH may be implemented based on a type of a new DOH, that is, a preceding general header is added based on a new type of DOH, to carry the preceding general indication information. This is not limited in this application.

FIG. 17A and FIG. 17B are schematic diagrams of a structure of a DOH in a BIERv6 service scenario according to an embodiment of this application. In FIG. 17A, a preceding general header is a TLV structure in the DOH, and may be referred to as preceding general TLV. The preceding general header includes an opt type field, an opt length field, a Flags field, a TLV Number field, a Function field, and a Parameter field. The opt type field is used to indicate a type of the preceding general TLV. In this example, a value of the opt type field is X. The opt length field is used to indicate a length of a V (value) part of the preceding general TLV. In this example, a value of the opt length field is 6. The Flags field includes first information used to indicate to process the DOH on a data plane. Optionally, the Flags field may further include fifth information used to ignore the DOH and continue to forward an IPv6 packet when processing of the DOH is not supported. Optionally, the Flags field may further include sixth information used to send an ICMP message to a source address of the IPv6 packet when the IPv6 packet is discarded. The TLV Number field is used to indicate a quantity of TLV options included in the DOH after the preceding general header. In this example, when a value of the TLV Number field is 1, it indicates that the DOH includes one TLV option after the preceding general header, that is, the BIER option. In another example, the value of the TLV Number field may alternatively be 0. It indicates that the TLV Number is not provided, that is, fourth information is optional. The Function field is used to indicate a function of the DOH. In this example, when a value of the Function field is 10, it indicates that a function of a subsequent TLV option is BIERv6. When a value of the Parameter field is not 0, it indicates a further sub-function of the BIERv6 function. In this example, when the value of the Parameter field is 0, it indicates that there is no further sub-function.

In FIG. 17B, a preceding general header is also a TLV structure, and may also be referred to as preceding general TLV. The preceding general header includes an opt type field, an opt length field, a value field, a Flags field, a TLV Number field, and a Parameter field. However, it should be noted that the first two bytes in the value part of the preceding general TLV are a value field defined in RFC 2711, and may be used as a function. For ease of description, the first two bytes may also be referred to as the Function field below, and the following four bytes are the Parameter, Flags, and TLV Number fields.

It should be noted that the value of the opt type field in the preceding general header may be newly applied for from the "Destination Options and Hop-by-Hop Options" registry of the IANA. For this, refer to https://www.iana.org/protocols. The value may alternatively be a defined value. For example, as shown in FIG. 15B, opt type=5 is defined in RFC 2711.

In addition, a sequence of the fields included in the preceding general header is different from the sequence of the fields shown in FIG. 17A. In other words, a sequence of the fields included in the preceding general header in some embodiments of this application may be flexibly set based on a requirement.

The BIER option is also a TLV structure, and includes an opt type field, an opt length field, and a BIER header field. That is, a V (value) part of the BIER option is a BIER header.

It should be understood that the structure of the DOH shown in FIG. 17A and FIG. 17B is merely an example. In the BIERv6 service scenario, the preceding general header in the DOH may alternatively be in the structure shown in FIG. 9 or FIG. 11. This is not limited in this application. That is, the preceding general header may be a fixed header in the DOH, or may be nested in a same TLV structure as the BIER option.

In the service scenario, a first routing device, a second routing device, and a third routing device all support IPv6 packet forwarding and BIERv6 processing. In addition, the first routing device, the second routing device, and the third routing device do not need to use a BIER specific IPv6 address, but may use a common IPv6 address. For example, the first routing device, the second routing device, and the third routing device use IPv6 addresses configured on their respective lookback interfaces. It should be understood that, generally, only a destination address of the IPv6 packet needs to process the DOH. Therefore, in the service scenario, a process in which the third routing device processes the IPv6 packet is used as an example for description.

The first routing device may receive an IP packet from a user side, encapsulate an IPv6 basic header and a DOH of any structure shown in FIG. 17A and FIG. 17B into the IP packet, to obtain the IPv6 packet, and further send the IPv6 packet to the second routing device.

The third routing device receives the IPv6 packet from the second routing device. The third routing device may allow, by using a newly added configuration, the data plane to process the preceding general header. After receiving the IPv6 packet, the third routing device first checks a Next Header field in the IPv6 basic header and determines that next head=60, and then checks the DOH and determines that the DOH includes a preceding general header (for example, preceding general indication information). The third routing device supports processing of the preceding general header in the DOH on the data plane. Therefore, the third routing device may continue to perform processing based on logic shown in pseudocode in FIG. 18.

In an example, it is determined whether the Flags field includes first information used to indicate to process the IPv6 packet on the data plane. If the Flags field includes the first information, it is further determined whether a type and/or a quantity of a TLV option indicated in the Function field and the TLV Number field are/is within a processing capability range of the data plane of the third routing device.

If a determining result is that the type and/or the quantity of the TLV option are/is within the processing range of the third routing device, the second routing device may process, on the data plane based on the value of the Function field and/or the value of the TLV Number field, the TLV option (for example, the BIER option) located after the preceding general header in the DOH. If the determining result is that the type and/or the quantity of the TLV option are/is not within the processing capability range of the data plane of the third routing device, the third routing device may discard the IPv6 packet on the data plane. Alternatively, the third routing device may determine, based on whether the Flags field includes sixth information, whether to send an ICMP message to a source address of the IPv6 packet. If the sixth information is included, the ICMP message is sent, or if the sixth information is not included, the ICMP message is not sent. The third routing device may further determine, based on act information in the opt type field in the preceding general header, whether to send the ICMP message.

In this way, for a case in which "the data plane does not support a specific function or TLV number" or "the data plane does not support any TLV processing of the DOH", the IPv6 packet may be quickly ignored without waiting for traversal of the one or more TLV options.

In some embodiments of this application, the routing device supports processing of the preceding general header, and the Flags field in the preceding general header includes the first information. Therefore, processing logic used when the Flags field does not include the first information shown in FIG. 18 is not used, and the IPv6 packet is not sent to a CPU for processing. Only when the routing device does not support processing of the preceding general header, the routing device may traverse one or more TLV options after the preceding general header according to the method described in RFC 8200, for example, send the IPv6 packet to the CPU for processing.

It can be learned that, in some embodiments of this application, after the third routing device supports processing of the preceding general header, if the IPv6 packet includes a subsequent TLV type that cannot be processed on the data plane, the third routing device may perform fast data plane processing on the IPv6 packet without sending the IPv6 packet to the CPU, for example, may discard the IPv6 packet. The ICMP message may be sent when the IPv6 packet is discarded. In this process, the ICMP message may be sent from the data plane to the CPU for processing by the CPU. The message may carry the IPv6 packet, but the CPU does not forward the IPv6 packet. "Require data plane processing" described above means that the IPv6 packet is forwarded or discarded on the data plane, but the ICMP message may not be sent on the data plane.

Figure 19:
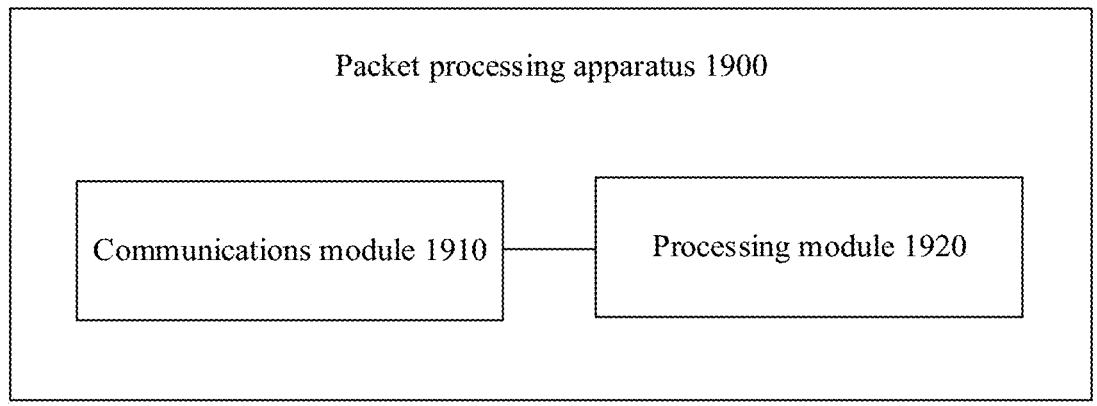
FIG. 19 is a schematic diagram of a structure of a packet processing apparatus according to an embodiment of this application.

An embodiment of this application provides a packet processing apparatus. FIG. 19 is a schematic diagram of a structure of a packet processing apparatus according to an embodiment of this application. The packet processing apparatus 1900 includes a communications module 1910 and a processing module 1920. The packet processing apparatus may be configured to implement a function of the first routing device in any one of the foregoing method embodiments, or may be configured to implement a function of the second routing device in any one of the foregoing method embodiments. For example, the packet processing apparatus may be a router or a switch, or the apparatus may be a chip included in the router or the switch.

When the packet processing apparatus is used as a first routing device to perform the method embodiment shown in FIG. 8, the communications module 1910 is configured to obtain an IPv6 packet, where the IPv6 packet includes an IPv6 extension header, the IPv6 extension header includes preceding general indication information, the preceding general indication information includes first information, and the first information is used to indicate to process the IPv6 packet only on a data plane of a routing device and not to send the IPv6 packet to a CPU. The processing module 1920 is configured to send the IPv6 packet to a next-hop routing device.

When the packet processing apparatus is used as a second routing device to perform the method embodiment shown in FIG. 8, the communications module 1920 is configured to receive an IPv6 packet from a previous-hop routing device, where the IPv6 packet includes an IPv6 extension header, the IPv6 extension header includes preceding general indication information, the preceding general indication information includes first information, and the first information is used to indicate to process the IPv6 packet only on a data plane of a routing device and not to send the IPv6 packet to a CPU. The processing module 1920 is configured to process the IPv6 packet on the data plane based on the first information.

It should be understood that the processing module 1920 in the packet processing apparatus may be implemented by a processor or a processor-related circuit component, and the communications module 1910 may be implemented by a transceiver or a transceiver-related circuit component. Operations and/or functions of the modules in the communications apparatus are used to implement corresponding procedures of the method shown in FIG. 8. For brevity, details are not described herein again.

Figure 20:
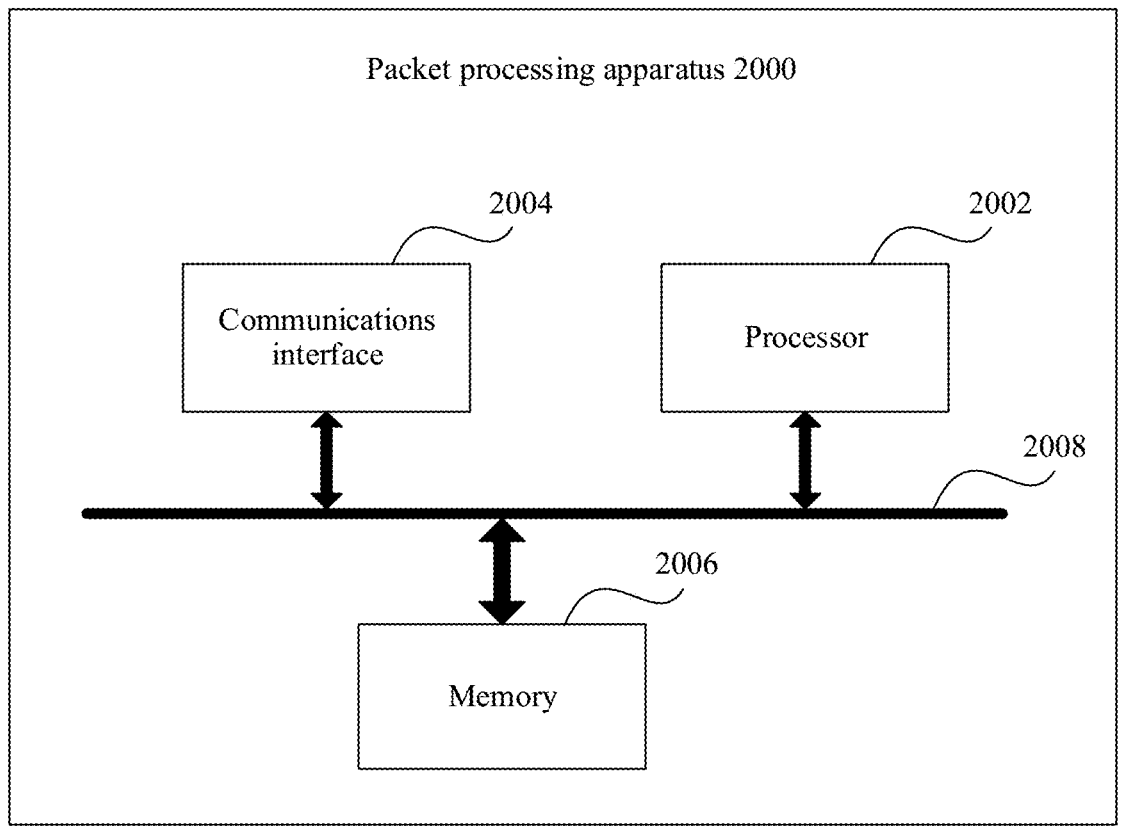
FIG. 20 is another schematic diagram of a structure of a packet processing apparatus according to an embodiment of this application.

FIG. 20 is another schematic diagram of a structure of a packet processing apparatus according to an embodiment of this application. The packet processing apparatus 2000 includes at least one processor 2002 and at least one communications interface 2004. Further, the packet processing apparatus may further include a memory 2006. The memory 2006 is configured to store a computer program or instructions. The memory 2006 may be a memory inside the processor, or may be a memory outside the processor. When the units and modules described in FIG. 19 are implemented by using software, software or program code required by the processing module 1920 to perform a corresponding action is stored in the memory 2006. The processor 2002 is configured to execute the program or the instructions in the memory 2006, to implement processing steps of the first routing device, the second routing device, or the third routing device in the foregoing embodiment. The communications interface 2004 is configured to implement communication between the apparatus and another routing device.

When the memory 2006 is disposed outside the processor, the memory 2006, the processor 2002, and the communications interface 2004 are connected to each other by using a bus 2008. The bus 2008 may be a peripheral component interconnect (PCI) bus or an extended industry standard architecture (EISA) bus. It should be understood that the bus may be classified into an address bus, a data bus, a control bus, and the like. For ease of representation, only one thick line is used to represent the bus in FIG. 20, but this does not mean that there is only one bus or only one type of bus.

It should be noted that the packet processing apparatus 2000 provided in some embodiments of this application may correspond to the first routing device, the second routing device, or the third routing device that performs the method embodiment provided in the embodiments of the present disclosure. In addition, operations and/or functions of the modules in the apparatus 2000 are respectively used to implement corresponding procedures of the method shown in FIG. 8. For brevity, details are not described herein again.

Figure 21:
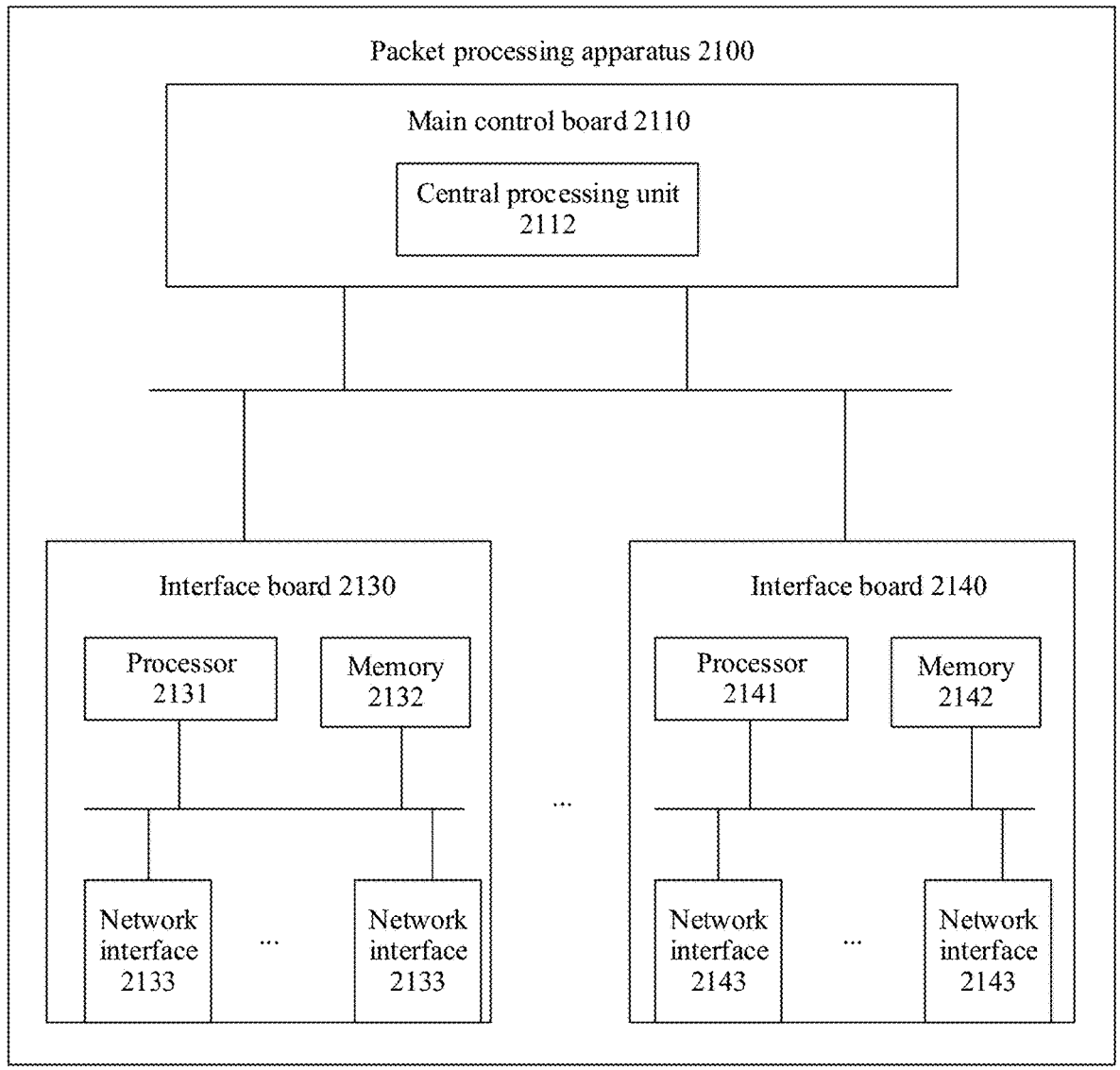
FIG. 21 is another schematic diagram of a structure of a packet processing apparatus according to an embodiment of this application.

FIG. 21 is another schematic diagram of a structure of a packet processing apparatus according to an embodiment of this application. The packet processing apparatus 2100 may be the first routing device, the second routing device, or the third routing device mentioned in the foregoing method embodiments. The packet processing apparatus 2100 may be a switch, a router, or another network device that forwards a packet. In some embodiments, the packet processing apparatus 2100 includes a main control board 2110, an interface board 2130, and an interface board 2140. When there are a plurality of interface boards, a switching board (not shown in the figure) may be included. The switching board is configured to complete data exchange between interface boards (the interface board is also referred to as a line card or a service board).

The main control board 2110 is configured to complete functions such as system management, device maintenance, and protocol processing. The interface boards 2130 and 2140 are configured to. provide various service interfaces (for example, a POS interface, a GE interface, and an ATM interface), and forward a packet. The main control board 2110 mainly includes three types of function units such as a system management and control unit, a system clock unit, and a system maintenance unit. The main control board 2110, the interface board 2130, and the interface board 2140 are connected to a system backboard by using a system bus to implement interworking. The interface board 2130 includes one or more processors 2131. The processor 2131 is configured to control and manage the interface board, communicate with a central processing unit on the main control board, and forward a packet. A memory 2132 on the interface board 2130 is configured to store a forwarding entry, and the processor 2131 forwards a packet by searching the forwarding entry stored in the memory 2132.

The interface board 2130 includes one or more network interfaces 2133 configured to receive an IPv6 packet sent by a previous-hop routing device, and send a processed IPv6 packet to a next-hop routing device according to an indication of the processor 2131. For a implementation process, refer to step S801 to step S806 in the embodiment shown in FIG. 8. Details are not described herein again.

The processor 2131 is configured to perform processing steps and functions of the first routing device, the second routing device, or the third routing device described in the foregoing method embodiments. For details, refer to step S801 to step S806 in the embodiment shown in FIG. 8. Details are not described herein.

It may be understood that, as shown in FIG. 21, some embodiments include a plurality of interface boards, and uses a distributed forwarding mechanism. In this mechanism, operations on the interface board 2140 are basically similar to operations on the interface board 2130. For brevity, details are not described again. In addition, it may be understood that the processor 2131 on the interface board 2130 and/or the processor 2141 in FIG. 21 may be dedicated hardware or a chip, for example, a network processor or an ASIC, to implement the foregoing functions. This implementation is generally referred to as a manner of using dedicated hardware or a chip for processing on a forwarding plane. In another implementation, the processor 2131 and/or the processor 2141 may alternatively be a general-purpose processor, for example, a general-purpose CPU, to implement the foregoing functions.

In addition, it should be noted that there may be one or more main control boards, and when there are a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, and the plurality of interface boards can provide a large-capacity data exchange and processing capability. Therefore, a data access and processing capability of the network device in the distributed architecture is greater than that of a device in the centralized architecture. A specific architecture that is to be used depends on a specific networking deployment scenario. This is not limited herein.

In a specific embodiment, the memory 2132 may be a ROM or another type of static storage device that can store static information and instructions, a random-access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 2132 is not limited thereto. The memory 2132 may exist independently, and is connected to the processor 2131 by using a communications bus. Alternatively, the memory 2132 may be integrated into the processor 2131.

The memory 2132 is configured to store program code, and execution is controlled by the processor 2131, to perform the packet processing method provided in the foregoing embodiment. The processor 2131 is configured to execute the program code stored in the memory 2132. The program code may include one or more software modules.

In a specific embodiment, the network interface 2133 may be an apparatus that uses any transceiver, and is configured to communicate with another device or a communications network, for example, the Ethernet, a radio access network (RAN), or a wireless local area network (WLAN).

Figure 22:
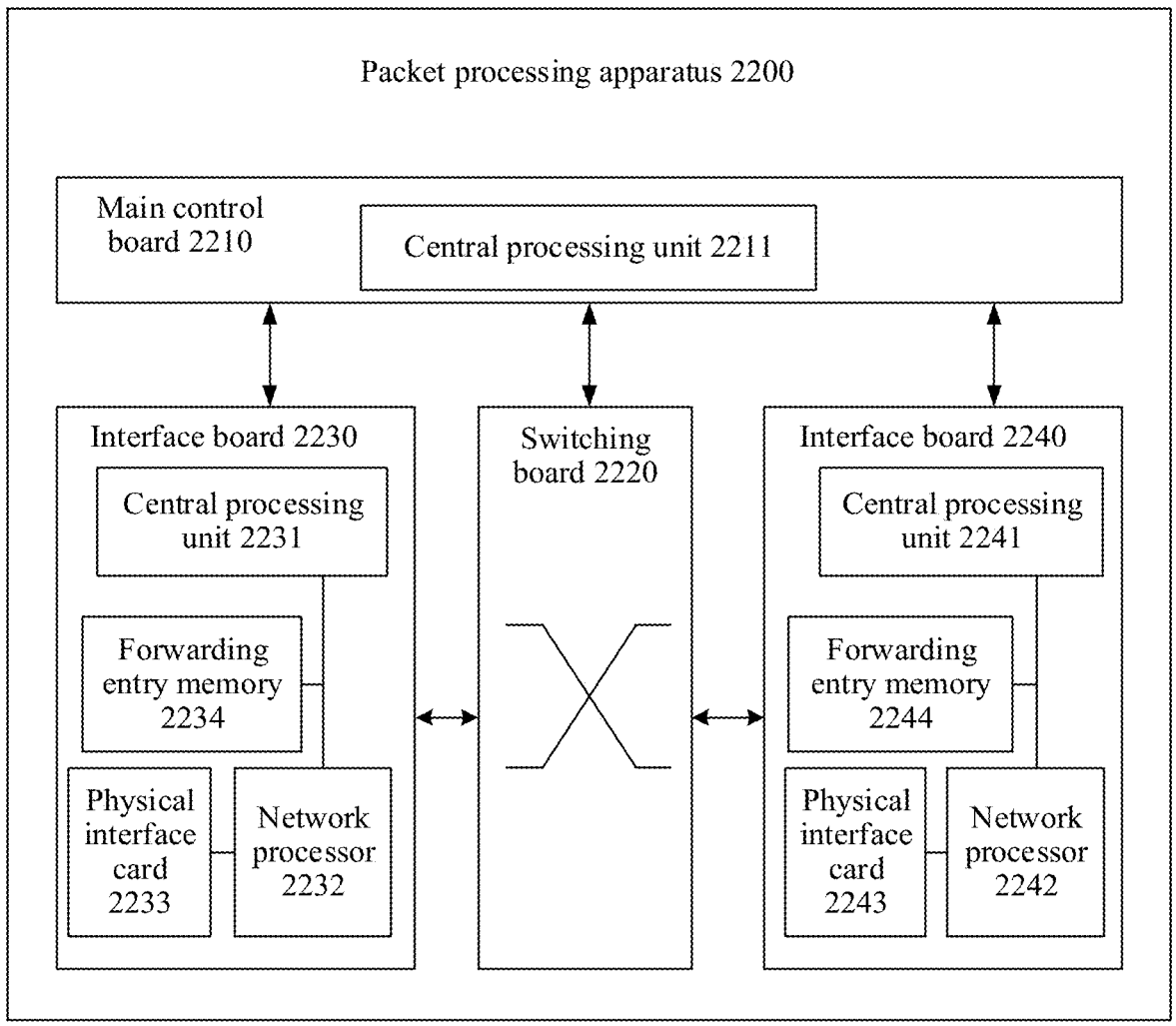
FIG. 22 is another schematic diagram of a structure of a packet processing apparatus according to an embodiment of this application.

FIG. 22 is another schematic diagram of a structure of a packet processing apparatus according to an embodiment of this application. The packet processing apparatus 2200 may be the first routing device, the second routing device, or the third routing device mentioned in the foregoing method embodiments. The packet processing apparatus 2200 may be a switch, a router, or another network device that forwards a packet. In some embodiments, the packet processing apparatus 2200 includes a main control board 2210, an interface board 2230, a switching interface 2220, and an interface board 2240. The main control board 2210 is configured to complete functions such as system management, device maintenance, and protocol processing. The switching board 2220 is configured to exchange data between interface boards (the interface board is also referred to as a line card or a service board). The interface boards 2230 and 2240 are configured to provide various service interfaces (for example, a POS interface, a GE interface, and an ATM interface), and forward a data packet. A control plane includes management and control units on the main control board 2210 and management and control units on the interface board 2230 and the interface board 2240. The main control board 2210 mainly includes three types of function units such as a system management and control unit, a system clock unit, and a system maintenance unit. The main control board 2210, the interface boards 2230 and 2240, and the switching board 2220 are connected to a system backboard through a system bus for communication. A central processing unit 2231 on the interface board 2230 is configured to control and manage the interface board, and communicate with a central processing unit on the main control board. A forwarding entry memory 2234 on the interface board 2230 is configured to store a forwarding entry, and a network processor 2232 forwards a packet by searching the forwarding entry stored in the forwarding entry memory 2234.

A physical interface card 2233 of the interface board 2230 is configured to receive an IPv6 packet sent by a previous-hop routing device node. For a specific implementation process, refer to step S801 to step S806 in the embodiment shown in FIG. 8. Details are not described herein again.

The network processor 2232 is configured to perform processing steps and functions of the first routing device, the second routing device, or the third routing device described in the foregoing method embodiments. For details, refer to step S801 to step S806 in the embodiment shown in FIG. 8. Details are not described herein again.

Then, the IPv6 packet that includes preceding general indication information is sent to a next-hop routing device by using the physical interface card 2233. For details, refer to step S801 to step S806 in the embodiment shown in FIG. 8. Details are not described herein again.

It may be understood that, as shown in FIG. 22, some embodiments include a plurality of interface boards, and uses a distributed forwarding mechanism. In this mechanism, operations on the interface board 2240 are basically similar to operations on the interface board 2230. For brevity, details are not described again. In addition, as described above, functions of the network processors 2232 and 2242 in FIG. 22 may be implemented by an ASIC.

In addition, it should be noted that there may be one or more main control boards, and when there are a plurality of main control boards, the main control boards may include an active main control board and a standby main control board. There may be one or more interface boards, and a device having a stronger data processing capability provides more interface boards. There may also be one or more physical interface cards on the interface board. There may be no switching board, or there may be one or more switching boards. When there are a plurality of switching boards, load sharing and redundancy backup may be implemented together. In a centralized forwarding architecture, the device may not need the switching board, and the interface board provides a function of processing service data of an entire system. In a distributed forwarding architecture, the device may have at least one switching board. Data exchange between a plurality of interface boards is implemented by using the switching board, to provide a large-capacity data exchange and processing capability. Therefore, a data access and processing capability of the network device in the distributed architecture is greater than that of a device in the centralized architecture. A specific architecture that is to be used depends on a specific networking deployment scenario. This is not limited herein.

An embodiment of this application further provides a chip system, including a processor. The processor is coupled to a memory. The memory is configured to store a program or instructions, and when the program or the instructions are executed by the processor, the chip system is enabled to implement the method in any method embodiment described above.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a ROM. The memory and the processor may be integrated into a same chip, or may be disposed on different chips. A type of the memory and a manner of disposing the memory and the processor are not limited in this application.

For example, the chip system may be a field-programmable gate array (FPGA), may be an ASIC, may be a system on chip (SoC), may be a CPU, may be a network processor (NP), may be a digital signal processor (DSP), may be a micro controller unit (MCU), or may be a programmable logic device (PLD) or another integrated chip.

It should be understood that steps in the foregoing method embodiment may be implemented by using a hardware integrated logical circuit in the processor or instructions in a form of software. The steps of the method disclosed with reference to the embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any method embodiment described above.

An embodiment of this application further provides a computer program product. When a computer reads and executes the computer program product, the computer is enabled to perform the method in any method embodiment described above.

An embodiment of this application further provides a network system. The communications system includes a first routing device, at least one second routing device, and a third routing device.

It should be understood that the processor mentioned in the embodiments of this application may be a CPU, a network-processor, another general-purpose processor, a DSP, an ASIC, a FPGA or another programmable logic device, a discrete or a transistor logic device, a discrete hardware component, a processing circuit, or a combination thereof. The general-purpose processor may be a microprocessor, or the processor may be any conventional processor or the like. Alternatively, the processor may be a combination of processors implementing a computing function, for example, a combination of one or more microprocessors, or a combination of a DSP and a microprocessor.

It may be further understood that the memory mentioned in the embodiments of this application may be a volatile memory or a nonvolatile memory, or may include a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example but not limitation, many forms of RAMs may be used, for example, a static random access memory (SRAM), a dynamic random access memory (DRAM), a synchronous dynamic random access memory (SDRAM), a double data rate (DDR) synchronous dynamic random access memory (DDR SDRAM), an enhanced synchronous dynamic random access memory (ESDRAM), a synchlink dynamic random access memory (SLDRAM), and a direct rambus (DR) dynamic random access memory (DR RAM).

It should be noted that, when the processor is a general-purpose processor, a DSP, an ASIC, an FPGA or another programmable logic device, a discrete gate, a transistor logic device, or a discrete hardware component, the memory (storage module) is integrated into the processor.

The communications interface mentioned in the embodiments of this application may be an interface card, or may be an Ethernet interface, an asynchronous transfer mode (ATM) interface, an interface circuit, or the like.

It should be noted that the memory described in this specification includes but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on implementation processes of the embodiments of the present disclosure.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, ROM, a RAM, a magnetic disk, or an optical disc.

The foregoing descriptions are implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first routing device comprising:
    a processor; and
    a memory coupled to the processor and configured to store instructions that when executed by the processor, cause the first routing device to:
        obtain an Internet Protocol version 6 (IPv6) packet, wherein the IPv6 packet comprises an IPv6 extension header, wherein the IPv6 extension header comprises preceding general indication information, and wherein the preceding general indication information comprises first information that instructs to process the IPv6 packet on a data plane of a routing device and to not send the IPv6 packet to a central processing unit (CPU); and
        send the IPv6 packet to a next-hop routing device based on the first information.

2. The first routing device of claim 1, wherein the IPv6 extension header further comprises at least one type-length-value (TLV) option, wherein the preceding general indication information further comprises at least one of second information, third information, or fourth information, wherein the second information indicates a first function or a first type of the at least one TLV option or indicates a second function or a second type of a primary TLV option in the at least one TLV option, wherein the third information indicates a third function or a third type of a secondary TLV option in the at least one TLV option, and wherein the fourth information indicates a quantity of the at least one TLV option.

3. The first routing device of claim 2, wherein the preceding general indication information further comprises fifth information, and wherein the fifth information instructs to ignore the IPv6 extension header and continue to forward the IPv6 packet or instructs to discard the IPv6 packet when a data plane of a routing device does not support processing of at least one TLV option.

4. The first routing device of claim 3, wherein the preceding general indication information further comprises sixth information, and wherein the sixth information instructs to send an Internet Control Message Protocol (ICMP) message to a source address of the IPv6 packet when the IPv6 packet is discarded.

5. The first routing device of claim 4, wherein the preceding general header comprises a Flags field, a Function field, a Parameter field, and a TLV Number field, wherein the Flags field comprises at least one of the first information, the fifth information, and the sixth information, wherein the Function field comprises the second information, wherein the Parameter field comprises the third information, and wherein the TLV Number field comprises the fourth information.

6. The first routing device of claim 1, wherein the preceding general indication information is included in a preceding general header of the IPv6 extension header, and wherein the preceding general header is located before at least one type length value (TLV) option.

7. The first routing device of claim 5, wherein the preceding general header is one of a fixed header of the IPv6 extension header is one piece of a preceding general TLV in the IPv6 extension header, or includes the at least one TLV option in one piece of a preceding general TLV in the IPv6 extension header.

8. The first routing device of claim 1, wherein the IPv6 extension header is a hop-by-hop options header (HBH) or a destination options header (DOH).

9. The first routing device of claim 8, wherein the IPv6 extension header is the HBH and the IPv6 packet is for a flow classified function or a path maximum transport unit (PMTU) function or wherein the IPv6 extension header is the DOH and the IPv6 packet supports a bit index explicit replication IPv6 encapsulation (BIERv6) function.

10. A second routing device comprising:
    a processor; and
    a memory coupled to the processor and configured to store instructions that when executed by the processor cause the second routing device to:
        receive an Internet Protocol version 6 (IPv6) packet from a previous-hop routing device, wherein the IPv6 packet comprises an IPv6 extension header comprising preceding general indication information, wherein the preceding general indication information comprises first information that instructs to process the IPv6 packet on a data plane of a routing device and to not send the IPv6 packet to a central processing unit (CPU); and
        process the IPv6 packet on second data plane of the second routing device based on the first information.

11. The second routing device of claim 10, wherein the IPv6 extension header further comprises at least one type length value (TLV) option, wherein the preceding general indication information further comprises at least one of second information, third information, or fourth information; wherein the second information indicates a first function or a first type of the at least one TLV option, or a second function or a second type of a primary TLV option in the at least one TLV option, wherein the third information indicates a third function or a third type of a secondary TLV option in the at least one TLV option, wherein the fourth information indicates a quantity of the at least one TLV option, and wherein the processor is further configured to execute the instructions to cause the second routing device to determine, based on at least one of the second information, the third information, or the fourth information, whether the data plane supports processing of the at least one TLV option.

12. The second routing device of claim 11, wherein the processor is further configured to execute the instructions to cause the second routing device to:
    determine, based on at least one of the second information, the third information, or the fourth information, that the data plane does not support processing of the at least one TLV option; and
    either ignore the IPv6 extension header and send the IPv6 packet to a next-hop routing device, or discard the IPv6 packet based on fifth information when the preceding general indication information comprises the fifth information.

13. The second routing device of claim 12, wherein the processor is further configured to execute the instructions to cause the second routing device to send, when discarding the IPv6 packet, an Internet Control Message Protocol (ICMP) message to a source address of the IPv6 packet based on sixth information when the preceding general indication information comprises the sixth information.

14. The second routing device of claim 13, wherein the processor is further configured to execute the instructions to cause the second routing device to:
    determine, in a process of traversing the at least one TLV option, that the data plane does not support processing of any TLV option in the at least one TLV option; and
    either ignore the IPv6 extension header and send the IPv6 packet to a next-hop routing device, or discard the IPv6 packet based on fifth information when the preceding general indication information comprises the fifth information.

15. The second routing device of claim 14, wherein the preceding general header comprises a Flags field, a Function field, a Parameter field, and a TLV Number field, wherein the Flags field comprises at least one of the first information, the fifth information, and the sixth information, wherein the Function field comprises the second information, wherein the Parameter field comprises the third information, and wherein the TLV Number field comprises the fourth information.

16. The second routing device of claim 11, wherein the processor is further configured to execute the instructions to cause the second routing device to:
    determine, based on at least one of the second information, the third information, and the fourth information, that the data plane supports processing of the at least one TLV option; and
    traverse the at least one TLV option.

17. The second routing device of claim 11, wherein the preceding general indication information is included in a preceding general header of the IPv6 extension header, and wherein the preceding general header is located before the at least one TLV option.

18. The second routing device of claim 16, wherein the preceding general header is one of a fixed header of the IPv6 extension header is one piece of a preceding general TLV in the IPv6 extension header, or includes the at least one TLV option in one piece of a preceding general TLV in the IPv6 extension header.

19. The second routing device of claim 10, wherein the IPv6 extension header is a hop-by-hop options header (HBH) or a destination options header (DOH).

20. A network system, comprising:
    a first routing device configured to:
        obtain an Internet Protocol version 6 (IPv6) packet, wherein the IPv6 packet comprises an IPv6 extension header, wherein the IPv6 extension header comprises preceding general indication information, wherein the preceding general indication information comprises first information that instructs to process the IPv6 packet on a data plane of a routing device and to not send the IPv6 packet to a central processing unit (CPU); and
        send the IPv6 packet; and
    a second routing device coupled to the first routing device and configured to:
        receive the IPv6 packet; and
        process the IPv6 packet on a second data plane of the second routing device based on the first information.

* * * * *